US009722490B2

(12) United States Patent
Archibald

(10) Patent No.: US 9,722,490 B2
(45) Date of Patent: Aug. 1, 2017

(54) SMOOTH TRANSITION OF A POWER SUPPLY FROM A FIRST MODE, SUCH AS A PULSE-FREQUENCY-MODULATION (PFM) MODE, TO A SECOND MODE, SUCH AS A PULSE-WIDTH-MODULATION (PWM) MODE

(71) Applicant: Intersil Americas LLC, Milpitas, CA (US)

(72) Inventor: Nicholas Archibald, San Francisco, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 134 days.

(21) Appl. No.: 14/231,691

(22) Filed: Mar. 31, 2014

(65) Prior Publication Data

US 2015/0061626 A1 Mar. 5, 2015

Related U.S. Application Data

(60) Provisional application No. 61/922,259, filed on Dec. 31, 2013, provisional application No. 61/874,351, filed on Sep. 5, 2013.

(51) Int. Cl.

*H02M 3/156* (2006.01)
*G06F 1/26* (2006.01)

(Continued)

(52) U.S. Cl.

CPC .............. *H02M 3/156* (2013.01); *G06F 1/26* (2013.01); *H02M 1/14* (2013.01); *H02M 3/157* (2013.01);

(Continued)

(58) Field of Classification Search

CPC ......... G06F 1/26; H02M 3/156; H02M 3/157; H02M 3/1588

See application file for complete search history.

(56) References Cited

U.S. PATENT DOCUMENTS

2006/0125454 A1 6/2006 Chen et al.
2007/0247131 A1 10/2007 Sohma (Continued)

OTHER PUBLICATIONS

Biranchinath Sahu, and Gabriel A. Rincón-Mora, “A High-Efficiency, Dual-Mode, Dynamic, Buck-Boost Power Supply IC for Portable Applications”, Proceedings of the 18th International Conference on VLSI Design held jointly with 4th International Conference on Embedded Systems Design (VLSID’05), Jan. 3-7, 2005, IEEE Conference Publications, 4 pages.

(Continued)

*Primary Examiner* — Jue Zhang

(74) *Attorney, Agent, or Firm* — Foley & Larder LLP; Mark J. Danielson

(57) ABSTRACT

In an embodiment, an apparatus, such as a power-supply controller, includes a generator and an adjuster. The generator is configured to provide a switching signal that causes a power supply to generate a regulated output signal, and the adjuster is configured to impart a condition to the power supply while the power supply is operating in a first mode, the condition being approximately equal to a condition that the power supply would have if the power supply were operating in a second mode. For example, such an apparatus may be able to reduce or eliminate a transient on a regulated output signal (e.g., a regulated output voltage) when a power supply transitions from a first operating mode, such as a pulse-frequency-modulation (PFM) mode, to a second operating mode, such as a pulse-width-modulation (PWM) mode.

29 Claims, 9 Drawing Sheets

(51) Int. Cl.

| | |
|---|---|
| *H02M 1/14* | (2006.01) |
| *H02M 3/157* | (2006.01) |
| *H02M 3/158* | (2006.01) |
| *H02M 1/00* | (2006.01) |

(52) U.S. Cl.

CPC .. *H02M 3/1588* (2013.01); *H02M 2001/0025* (2013.01); *H02M 2001/0032* (2013.01); *Y02B 70/1466* (2013.01); *Y02B 70/16* (2013.01)

(56) References Cited

U.S. PATENT DOCUMENTS

| | | | | |
|---|---|---|---|---|
| 2008/0298089 | A1 | 12/2008 | Reberga et al. | |
| 2009/0040791 | A1 | 2/2009 | Qahouq et al. | |
| 2010/0164455 | A1 | 7/2010 | Li et al. | |
| 2010/0301822 | A1* | 12/2010 | Chen | H02M 3/156 323/283 |
| 2012/0212203 | A1* | 8/2012 | Harrison | H02M 3/156 323/283 |
| 2013/0235621 | A1* | 9/2013 | Yan | H02M 3/33507 363/21.12 |
| 2014/0084886 | A1 | 3/2014 | Causse et al. | |
| 2015/0061617 | A1 | 3/2015 | Archibald | |
| 2015/0061618 | A1 | 3/2015 | Archibald | |
| 2015/0062108 | A1 | 3/2015 | Archibald | |

OTHER PUBLICATIONS

Chien-Hung Tsai, Chun-Hung Yang, Jiunn-Hung Shiau, and Bo-Ting Yeh, "Digitally Controlled Switching Converter With Automatic Multimode Switching", IEEE Transactions on Power Electronics, vol. 29, No. 4, April 2014, IEEE Journals & Magazines, pp. 1830-1839.

Xu Zhang, and Dragan Maksimovic, "Digital PWM/PFM Controller with Input Voltage Feed-Forward for Synchronous Buck Converters", Twenty-Third Annual IEEE Applied Power Electronics Conference and Exposition, 2008. APEC Feb. 24-28, 2008, IEEE Conference Publications, 6 pages.

Xu Zhang, and Dragan Maksimovic, "Multimode Digital Controller for Synchronous Buck Converters Operating Over Wide Ranges of Input Voltages and Load Currents", IEEE Transactions on Power Electronics, vol. 25, No. 8, Aug. 2010, IEEE Journals & Magazines, pp. 1958-1965.

U.S. Patent and Trademark Office, "Advisory Action", "from U.S. Appl. No. 14/479,112", Jun. 20, 2016, pp. 1-13, Published in: US.

U.S. Patent and Trademark Office, "Final Office Action", "U.S. Appl. No. 14/479,112", Mar. 22, 2016, pp. 1-17, Published in: US.

U.S. Patent and Trademark Office, "Advisory Action", "from U.S. Appl. No. 14/479,048", Jun. 9, 2016, pp. 1-4, Published in: US.

U.S. Patent and Trademark Office, "Final Office Action", "U.S. Appl. No. 14/479,048", Mar. 18, 2016, pp. 1-16, Published in: US.

U.S. Patent and Trademark Office, "Advisory Action", "from U.S. Appl. No. 14/479,076", Jun. 9, 2016, pp. 1-3, Published in: US.

U.S. Patent and Trademark Office, "Final Office Action", "from U.S. Appl. No. 14/479,076", Mar. 28, 2016, pp. 1-18, Published in: US.

United States Patent and Trademark Office, "Office Action", "from U.S. Appl. No. 14/479,112", Mar. 3, 2017, pp. 1-22, Published in: US.

United States Patent and Trademark Office, "Notice of Allowance", "from U.S. Appl. No. 14/479,048", Feb. 28, 2017, pp. 1-14, Published in: US.

* cited by examiner 10
12
LOAD
$V_{out}$
$I_{load}$
$I_{out}$
20
18
60
58
35
$V_{in}$
$I_{Inductor}$
16
54
14
Zero_Current
Switch_charge
Switch_discharge
21
OSC
OSC
Switching Controller
26
$I_{peak\_Ref}$
56
Loop_Control_3
Loop_Control_2
Loop_Control_4
32
40
44
46
$V_{ref}$
38
57
33
24
Switching_Control
36
34
SAWTOOTH
22
Loop_Control_1
50
52
48
28
42
30

10
12
LOAD
Vout
20
35
60
58
18
Switch_discharge
54
Switch_charge
Zero-Current
21
OSC
OSC
mode
Ipeak_PFM_ref
Loop_Control_2
44
46
16
Vin
Switching Controller
26
56
Vref
84
xS
38
57
PFM comparator
33
Switching_Control
Loop_Control_4
Loop_Control_3
32
24
88
mode
86
mode
82
xS
80
Adjuster
22
30
90
50
52
48
Loop_Control_1
28
42
14

10
12
LOAD
$I_{load}$
20
$V_{out}$
35
60
18
58
Switch_discharge
54
$V_{in}$
16
Zero-Current
Switch_charge
21
OSC
OSC
$I_{peak\_ref}$
56
Loop_Control_2
Loop_Control_3
44
46
$V_{ref}$
Switching Controller
26
mode
Switching_Control
Loop_Control_4
84
x S
38
57
PFM comparator
33
32
88
mode
24
90
50
52
42
86
mode
82
x S
80
Adjuster
30
Loop_Control_1
48
28
22
14

SMOOTH TRANSITION OF A POWER SUPPLY FROM A FIRST MODE, SUCH AS A PULSE-FREQUENCY-MODULATION (PFM) MODE, TO A SECOND MODE, SUCH AS A PULSE-WIDTH-MODULATION (PWM) MODE

PRIORITY CLAIM

The present application claims priority to U.S. Provisional Patent Application Nos. 61/922,259, filed 31 Dec. 2013, and 61/874,351 filed 5 Sep. 2013; both of which applications are incorporated herein by reference in their entireties.

SUMMARY

In an embodiment, an apparatus, such as a power-supply controller, includes a switching controller and an adjuster. The switching controller is configured to provide a switching signal that causes a power supply to generate a regulated output signal, and the adjuster is configured to impart a condition to the power supply while the power supply is operating in a first mode, the condition being approximately equal to a condition that the power supply would have if the power supply were operating in a second mode.

For example, an embodiment of such an apparatus may be able to reduce or eliminate a transient on a regulated output signal (e.g., a regulated output voltage) when a power supply transitions from a first operating mode, such as a pulse-frequency-modulation (PFM) mode, to a second operating mode, such as a pulse-width-modulation (PWM) mode. To so reduce or eliminate such a transient, during the first operating mode, the apparatus may maintain a control signal that is used for regulation in the second operating mode at approximately the level that it would have if the apparatus were in the second mode. Consequently, at the time of the transition from the first mode to the second mode, the control signal has, at least approximately, the level needed to maintain the output signal at its regulated value after the apparatus transitions to the second mode. That is, after the transition to the second mode, the apparatus needs little or no time to reacquire the proper level of the control signal via the action of a finite-bandwidth control loop, thus reducing or eliminating a transition-induced transient that may occur on the output signal.

DETAILED DESCRIPTION

Figure 1:
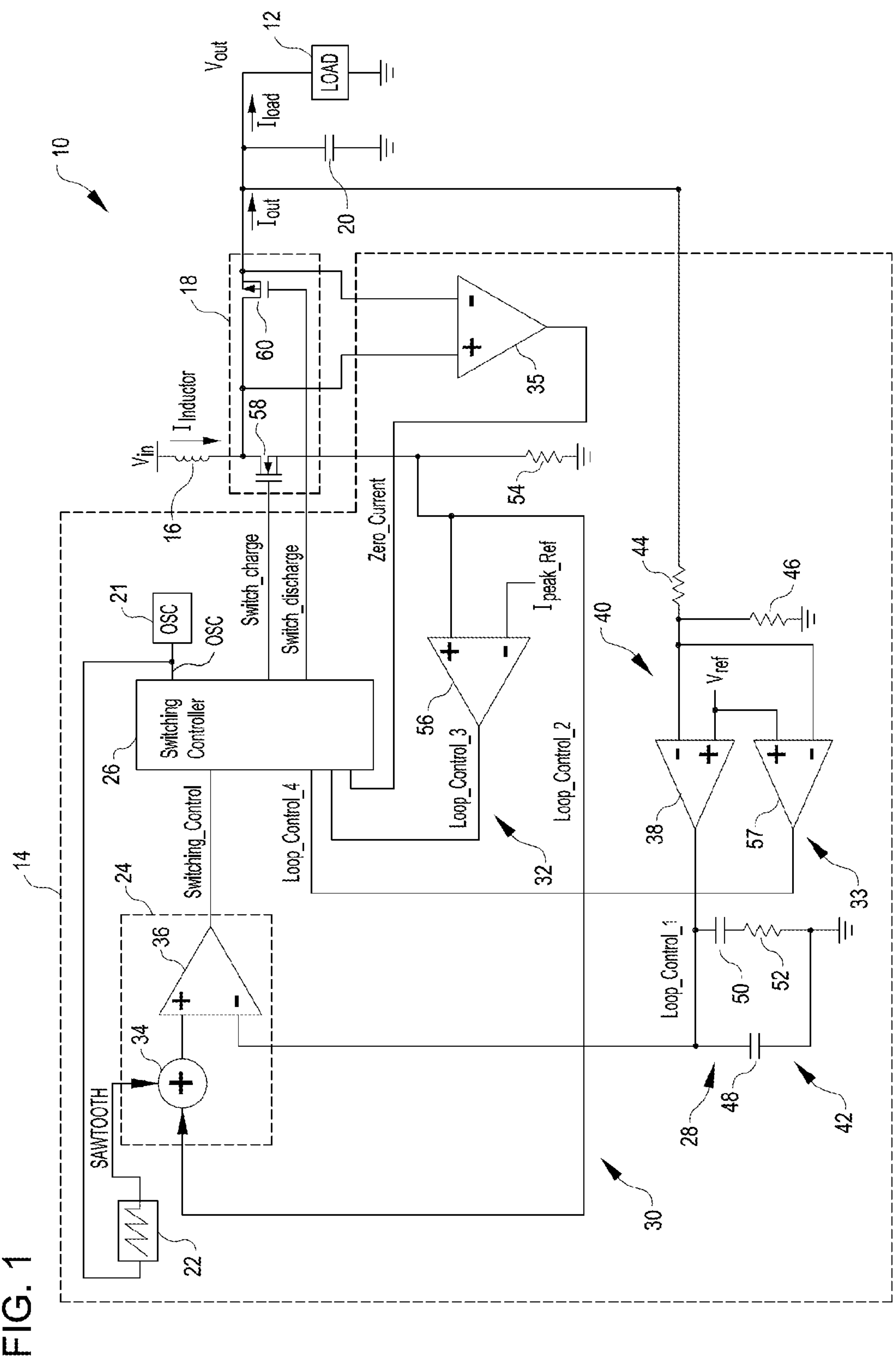
FIG. 1 is a diagram of a power supply, and of a load that receives power from the power supply.

FIG. 1 is a schematic diagram of a power supply, here a boost converter (sometimes called a boost regulator) 10, and a load 12, which receives power from the boost converter, according to an embodiment. The boost converter 10 converts an input signal, here an input voltage $V_{in}$, into a regulated output signal, here a regulated output voltage $V_{out}$, where $V_{out}>V_{in}$; for example, $V_{in}$=3.3 Volts (V) and $V_{out}$=5.0 V. And the load 12 may include any type of load, for example, an integrated computing circuit such as a microprocessor or microcontroller. One may model the load 12 as a purely resistive impedance, although it is contemplated that the load can include capacitive and inductive impedance components (i.e., can be modeled as a complex impedance), can change its state (e.g., transition from an "awake" state to a "sleep" state and vice-versa), and thus can change its impedance and current consumption. Consequently, the boost converter 10 is configured to regulate $V_{out}$ to a set voltage level over a range of load impedances and load current consumptions.

The boost converter 10 is configured to operate in at least the following three modes: a continuous pulse-width-modulation (PWM) mode, a discontinuous PWM mode, and a pulse-frequency-modulation (PFM) mode. During a continuous PWM mode, the load 12 draws a relatively high current (e.g., the load is "awake"), and the boost converter 10 switches at a constant switching frequency $f_{s\_PWM}$ having a duty cycle $D_{PWM}$, which the boost converter adjusts to regulate $V_{out}$ to a set voltage level. During a discontinuous PWM mode, the load 12 draws a lower current (e.g., the load is in an intermediate state such as "idle"), and the boost converter 10 continues to switch at a constant switching frequency $f_{s\_PWM}$ having a duty cycle $D_{PWM}$, which the boost converter adjusts to regulate $V_{out}$ to a set voltage level. Sometimes the continuous and discontinuous PWM modes are collectively referred to as a "PWM mode". And during a PFM mode, the load 12 draws a lower current than it does in the continuous PWM mode, and may draw an even lower current than it does in discontinuous PWM mode (e.g., the load is light or "asleep"), and the boost converter 10 switches at a variable frequency $f_{s\_PWM}$, which depends on the level of the load current $I_{Load}$ that the load draws. The continuous and discontinuous PWM modes, and the PFM mode, are described further below.

The boost converter 10 includes power-supply control circuitry 14, a filter inductor 16, a switching stage 18, and an output filter capacitor 20. The boost converter 10 can also include other components and circuitry that are omitted for brevity. In an embodiment, some of these components, or portions thereof, may be disposed on an integrated power-supply controller; for example, some or all of the components of the power-supply control circuitry 14 and the switching stage 18 may be disposed on such an integrated power-supply controller. Furthermore, the power-supply controller, and some or all of any other components that are not disposed on the power-supply controller, may be disposed within a packaged power-supply module.

The power-supply control circuitry 14 is configured to control the operation of the boost converter 10, to receive as feedback signals the output voltage $V_{out}$ and the current $I_{Inductor}$ through the filter inductor 16, and to generate one or more switching signals, here switching voltage signals SWITCH_CHARGE and SWITCH_DISCHARGE, which control the switching stage 18.

The power-supply control circuitry 14 includes an oscillator 21, a ramp generator 22, a summing comparator 24, a switching controller 26, first, second, third, and fourth control loops 28, 30, 32, and 33, and a comparator 35.

The oscillator 21 is configured to generate an oscillator signal, here a voltage OSC, having a frequency $f_{osc}$, and to provide OSC to the ramp generator 22 and the switching controller 26 during continuous and discontinuous PWM modes of operation. In contrast, during a PFM mode, the oscillator 21 may not be used, and, therefore, the control circuit 14 may be configured to deactivate the oscillator 21 to save power.

The ramp generator 22 is configured to generate a sawtooth signal, here a voltage SAWTOOTH, having a frequency $f_{sawtooth}$, which equals the oscillator frequency $f_{osc}$, and which also equals the frequency $f_{s\_PWM}$ of the switching signals, here voltages, SWITCH_CHARGE and SWITCH_DISCHARGE, during continuous and discontinuous PWM modes of operation such that:

$$f_{sawtooth}=f_{s\_PWM}=f_{osc} \quad (1)$$

In contrast, during a PFM mode the ramp generator 22 is not used, and the control circuit 14 may be configured to deactivate the ramp generator to save power.

The summing comparator 24 includes a summer 34 and a comparator 36, which, during continuous and discontinuous PWM modes, are configured to cooperate to generate a switching control signal, here a switching control voltage SWITCHING_CONTROL, in response to the voltage SAWTOOTH, from the ramp generator 22, and the signals, here voltages, LOOP_CONTROL_1 and LOOP_CONTROL_2, from the first and second control loops 28 and 30, respectively.

The switching controller 26 includes circuitry that is configured to generate the charge and discharge switching voltages SWITCH_CHARGE and SWITCH_DISCHARGE in response to the oscillator signal OSC and the voltage SWITCHING_CONTROL during a continuous PWM mode, in response to OSC, SWITCHING_CONTROL, and a signal, here a voltage, ZERO_CURRENT from the comparator 35 during a discontinuous PWM mode, and in response to ZERO_CURRENT and signals, here voltages, LOOP_CONTROL_3 from the control loop 32 and LOOP_CONTROL_4 from the control loop 33 during a PFM mode.

The first control loop 28 is configured to be active during continuous and discontinuous PWM modes and inactive during a PFM mode, and includes, in addition to the summing comparator 24, a low-gain transconductance ($g_m$) amplifier 38, a feedback network 40, and a low-pass-filter network 42. The amplifier 38 has a noninverting input node coupled to receive a stable reference signal, here a band-gap-derived reference voltage $V_{ref}$ (although not shown, the boost converter 10 may include a generator, such as a band-gap generator, configured to generate $V_{ref}$), and includes an inverting input node coupled to receive a divided-down, e.g., scaled, version of $V_{out}$ through the feedback network 40, which here is a voltage divider that includes resistors 44 and 46. And the low-pass-filter network 42 includes capacitors 48 and 50 and a resistor 52, which provide second-order compensation to the first control loop 28. During continuous and discontinuous PWM modes, the amplifier 38 and networks 40 and 42 of the first control loop 28 are configured to cooperate to generate the signal, here a voltage, LOOP_CONTROL_1 in response to $V_{out}$; conversely, during a PFM mode, the first control loop is disabled (e.g., by the control circuit 14 effectively causing the switching controller 26 to "ignore" LOOP_CONTROL_1) and the control circuit may be configured to disable the amplifier 38, the summing comparator 24, the ramp generator 22, and possibly the oscillator 21, to save power.

The second control loop 30 is configured to be active during continuous and discontinuous PWM modes and inactive during a PFM mode, and includes, in addition to the summing comparator 24, a sense component, here a sense resistor 54, which provides feedback of the inductor-current information to the second control loop during the charging phase of the filter inductor 16. During continuous and discontinuous PWM modes, the sense resistor 54 is configured to convert the current $I_{inductor}$ through the inductor 16 into the signal, here a voltage, LOOP_CONTROL_2. Conversely, during a PFM mode, the control loop 30 is disabled (e.g., by the control circuit 14 effectively causing the switching controller 26 to "ignore" LOOP_CONTROL_2).

The third control loop 32 is configured to be active during continuous and discontinuous PWM modes and active during a PFM mode, and includes, in addition to the sense resistor 54, a comparator 56, which has a noninverting input node coupled to receive the voltage LOOP_CONTROL_2 and has an inverting node coupled to receive a stable reference signal, such as a band-gap-derived reference voltage, $I_{PEAK\_REF}$. During continuous and discontinuous PWM modes, the comparator 56 is configured to generate LOOP_CONTROL_3 in response to LOOP_CONTROL_2 and $I_{PEAK\_REF}$ so as to allow the switching controller 26 to provide fault protection by limiting the peak of the inductor current $I_{Inductor}$ to a configurable level set by $I_{PEAK\_REF}$. Similarly, during a PFM mode, the comparator 56 is configured to generate LOOP_CONTROL_3 in response to LOOP_CONTROL_2 and $I_{PEAK\_REF}$ to set the peak of the PFM inductor current $I_{Inductor}$ to a configurable level set by $I_{PEAK\_REF}$. Therefore, $I_{PEAK\_REF}$ may have different values in PWM and PFM modes; for example, $I_{PEAK\_REF}$ is almost always lower in PFM mode than it is in continuous or discontinuous PWM mode. Although not shown in FIG. 1, the power-supply control circuitry 14 may include a multiplexer having an output node that provides $I_{PEAK\_REF}$ to the inverting input node of the amplifier 56, having multiple input nodes each coupled to a respective voltage levels $I_{PEAK\_REF\_PWM\_CONTINUOUS}$, $I_{PEAK\_REF\_PWM\_DISCONTINUOUS}$, and $I_{PEAK\_REF\_PFM}$, and having a control node coupled to the switching controller 26. While the boost converter 10 is operating in a continuous PWM mode, the switching controller 26 controls the multiplexer to couple $I_{PEAK\_REF\_PWM\_CONTINUOUS}$ to the multiplexer output node such that $I_{PEAK\_REF}=I_{PEAK\_REF\_PWM\_CONTINUOUS}$. Similarly, while the boost converter 10 is operating in a discontinuous PWM mode, the switching controller 26 controls the multiplexer to couple $I_{PEAK\_REF\_PWM\_DISCONTINOUS}$ to the multiplexer output node such that $I_{PEAK\_REF}=I_{PEAK\_REF\_PWM\_DISCONTINUOUS}$, and while the boost converter 10 is operating in a PFM mode, the switching controller 26 controls the multiplexer to couple $I_{PEAK\_REF\_PFM}$ to the multiplexer output node such that $I_{PEAK\_REF}=I_{PEAK\_REF\_PFM}$. Alternatively, $I_{PEAK\_REF\_PWM\_DISCONTINUOUS}=I_{PEAK\_REF\_PWM\_CONTINUOUS}=I_{PEAK\_REF\_PWM}$ such that the multiplexer has two input nodes each coupled to a respective voltage levels $I_{PEAK\_REF\_PWM}$ and $I_{PEAK\_REF\_PFM}$. While the boost converter 10 is operating in a continuous or discontinuous PWM mode, the switching controller 26 controls the multiplexer to couple $I_{PEAK\_REF\_PWM}$ to the multiplexer output node such that $I_{PEAK\_REF}=I_{PEAK\_REF\_PWM}$, similarly, while the boost converter 10 is operating in a PFM mode, the switching controller 26 controls the multiplexer to couple $I_{PEAK\_REF\_PFM}$ to the multiplexer output node such that $I_{PEAK\_REF}=I_{PEAK\_REF\_PFM}$.

Still referring to FIG. 1, the fourth control loop 33 is configured to be inactive during continuous and discontinuous PWM modes and active during a PFM mode, and includes a comparator 57, which has a noninverting input node coupled to receive the reference voltage $V_{ref}$ and has an inverting node coupled to receive the divided-down version of $V_{out}$ from the feedback network 40. During continuous and discontinuous PWM modes, the control loop 33 is disabled (e.g., by the control circuit 14 effectively causing the switching controller 26 to "ignore" LOOP_CONTROL_4), and the control circuit may disable the comparator 57 to save power; conversely, during a PFM mode, the comparator 57 is configured to generate the signal, here a voltage, LOOP_CONTROL_4 in response to the voltages $$V_{ref} \text{ and } \frac{R_{46}}{R_{44}+R_{46}} \cdot V_{out}.$$

The comparator 35 includes an inverting input node coupled to receive $V_{out}$ and a non-inverting input node coupled to the junction between the inductor 16 and the switching stage 18, and is configured to generate the signal, here a voltage, ZERO_CURRENT on an output node that is coupled to the switching controller 26; ZERO_CURRENT is valid (i.e., is "recognized" by the switching controller) only when a transistor 60 (described further below) is "on" (i.e., when SWITCH_DISCHARGE has a logic-low level in the case where MOSFET 60 is a PFET as shown in FIG. 1), and provides information to the switching controller regarding the direction of $I_{out}$. As described below, during a discontinuous PWM mode and a PFM mode, the comparator 35 is configured to generate ZERO_CURRENT having a logic-low level to indicate that the current $I_{out}$ is zero or less than zero; and in response to ZERO_CURRENT having a logic-low level, the switching controller 26 configures the switching stage 18 so that $I_{out}$ does not flow in a reverse direction from the capacitor 20 back through the switching stage.

Still referring to FIG. 1, the switching stage 18 includes an inductor-charging switch, here an NMOS transistor 58, which includes a control node that is coupled to receive the signal SWITCH_CHARGE from the switching controller 26, and includes an inductor-discharging switch, here the PMOS transistor 60, which includes a control node that is coupled to receive the signal SWITCH_DISCHARGE from the switching controller. Although not shown in FIG. 1, there may be respective buffers disposed between logic circuitry within the switching controller 26 and the transistors 58 and 60; these buffers may be located within, or outside of, the switching controller.

Figure 2:
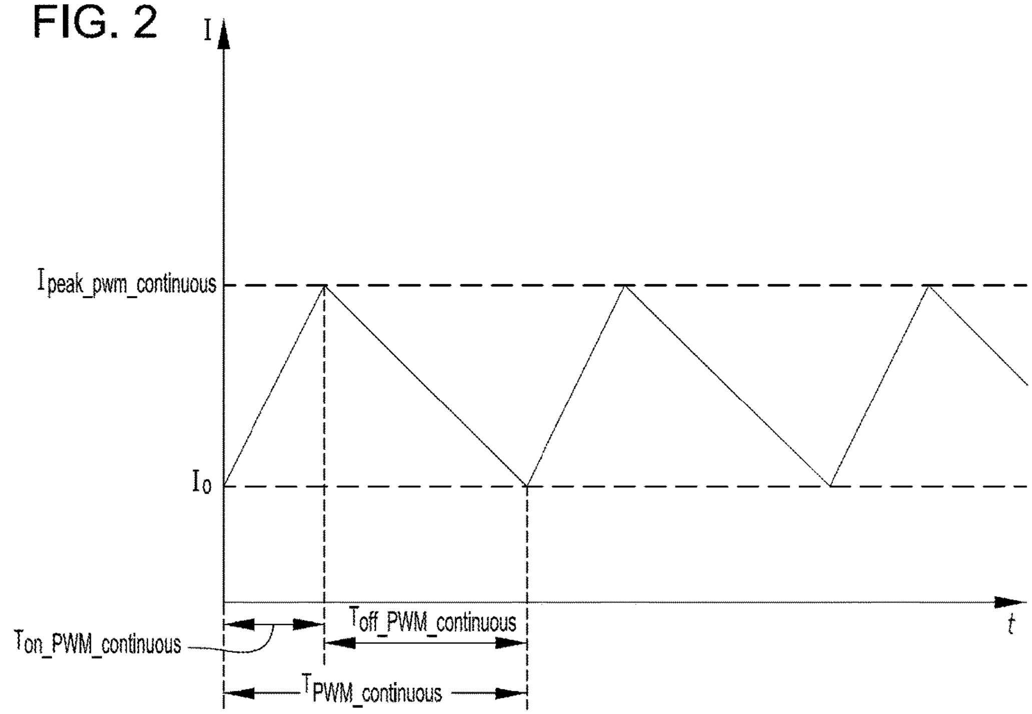
FIG. 2 is a plot of the inductor current of the power supply of FIG. 1 versus time during a continuous pulse-width-modulation (PWM) mode of operation.

FIG. 2 is a plot of the inductor current $I_{inductor}$ through the inductor 16 of the boost converter 10 of FIG. 1 versus time during a continuous PWM mode of operation, according to an embodiment.

Figure 3:
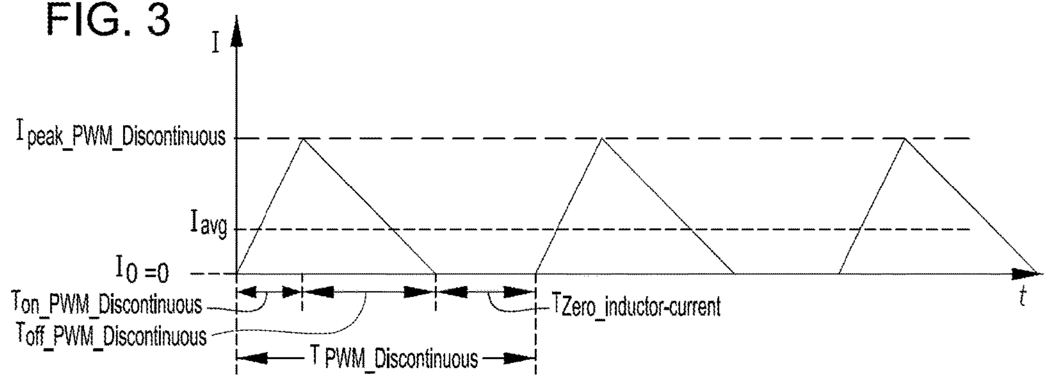
FIG. 3 is a plot of the inductor current of the power supply of FIG. 1 versus time during a discontinuous PWM mode of operation.

FIG. 3 is a plot of the inductor current $I_{inductor}$ through the inductor 16 of the boost converter 10 of FIG. 1 versus time during a discontinuous PWM mode of operation, according to an embodiment.

Figure 4:
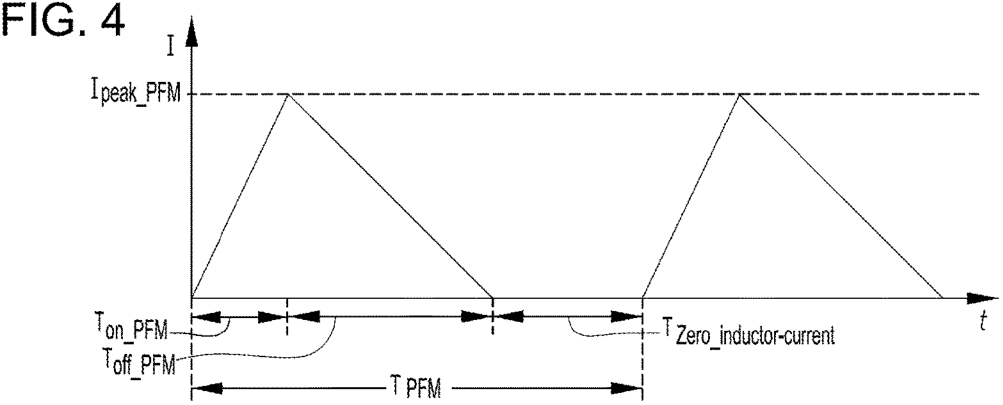
FIG. 4 is a plot of the inductor current of the power supply of FIG. 1 versus time during a pulse-frequency-modulation (PFM) mode of operation.

FIG. 4 is a plot of the inductor current $I_{Inductor}$ through the inductor 16 of the boost converter 10 of FIG. 1 versus time during a PFM mode of operation, according to an embodiment.

Referring to FIGS. 1 and 2, operation of the boost converter 10 is described during a continuous PWM mode of operation, according to an embodiment.

During a continuous PWM mode, the inductor current $I_{Inductor}(t)>0$ during the entire switching period $T_{PWM\_continuous}$.

In response to an active edge of the oscillator signal OSC from the oscillator 21, the ramp generator 22 transitions the signal SAWTOOTH to its lowest voltage level, and the switching controller 26 generates a logic-high level for the voltage signal SWITCH_CHARGE, and generates a logic-high level typically equal to, but possibly greater than, $V_{out}$ for the voltage signal SWITCH_DISCHARGE such that the transistor 58 is conducting (i.e., "on") and the transistor 60 is nonconducting (i.e., "off"). Therefore, in response to the active edge of OSC, both SAWTOOTH and $I_{inductor}(t)$ begin to ramp upward from their respective lowest levels.

While the sum of the voltage signals SAWTOOTH and LOOP_CONTROL_2 output from the summer 34 is less than the voltage signal LOOP_CONTROL_1, the comparator 36 generates a logic-low level for the voltage signal SWITCHING_CONTROL.

In response to the logic-low level for SWITCHING_CONTROL, the switching controller 26 maintains a logic-high level for the voltage signal SWITCH_CHARGE, and maintains a logic-high level equal to, or greater than, $V_{out}$ for the voltage signal SWITCH_DISCHARGE such that the transistor 58 remains conducting (i.e., "on") and the transistor 60 remains nonconducting (i.e., "off").

The respective "on" and "off" states of the transistors 58 and 60 cause the inductor current $I_{Inductor}$ to flow from $V_{in}$ and through the inductor 16, transistor 58, and sense resistor 54. The rate of change, $dI_{Inductor}/dt$, of the current $I_{Inductor}$ through the inductor 16 is related to the inductance L of the inductor and to the voltage $V_{Inductor}$ across the inductor according to the following equation:

$$dI_{Inductor}/dt=V_{Inductor}/L \tag{2}$$

Therefore, while the transistor 58 is "on" and the transistor 60 is "off", the current $I_{Inductor}(t)$ (the variable "t" indicates that the inductor current is a function of time) is given by the following equation, for which it is assumed that the "on" voltage of the transistor 58, the voltage across the sense resistor 54, and the equivalent series resistance (ESR) of the inductor 16 are negligible:

$$I_{Inductor}(t)=I_o+(V_{in}/L)\cdot t \tag{3}$$

where $I_o$ is the initial value of the inductor current $I_{Inductor}(t)$ when the transistor 58 turns on, L is the inductance of the inductor 16, and t is time in seconds. Therefore, while the transistor 58 is "on", $I_{Iinductor}(t)$ linearly ramps upward from $I_o$ at a constant rate of $V_{in}/L$.

In response to the linear ramping current $I_{Inductor}(t)$, the sense resistor 54 effectively converts this ramping inductor current to a ramping voltage LOOP_CONTROL_2 according to the following equation:

$$\text{LOOP\_CONTROL\_2}(t)=I_{Inductor}(t)\cdot R_{sense}=(I_o+V_{in}/L\cdot t)\cdot R_{sense} \tag{4}$$

where $R_{sense}$ is the resistance of the sense resistor 54.

In response to the sum of the ramping voltage signals SAWTOOTH and LOOP_CONTROL_2 from the summer 34 being greater than the voltage signal LOOP_CONTROL_1, the comparator 36 transitions the voltage signal SWITCHING_CONTROL to a logic-high level.

In response to the logic-high level for SWITCHING_CONTROL, the switching controller 26 generates a logic-low level (e.g., zero voltage or the ground voltage level) for the voltage signal SWITCH_CHARGE, and generates a logic-low level on SWITCH_DISCHARGE, such that the transistor 58 is nonconducting (i.e., "off") and the transistor 60 is conducting (i.e., "on").

The respective "off" and "on" states of the transistors 58 and 60 cause the inductor current $I_{Inductor}(t)=I_o(t)$ to flow from $V_{in}$, through the inductor 16 and the transistor 60, and into the output capacitor 20 and the load 12.

Therefore, while the transistor 58 is "off" and the transistor 60 is "on", the current $I_{Inductor}(t)=I_{out}(t)$ is given by the following equation, for which it is assumed that the "on" voltage of the transistor 60 and the ESR of the inductor 16 are negligible:

$$I_{Inductor}(t)=I_{out}(t)=I_{peak\_PWM\_continuous}-((V_{out}-V_{in})/L)\cdot t \tag{5}$$

where $I_{peak\_PWM\_continuous}$ is the initial (peak) value of the current $I_{Inductor}(t)=I_{out}(t)$ when the transistor 58 turns off. Therefore, while the transistor 58 is "off" and the transistor 60 is "on," $I_{Inductor}(t)=I_{out}(t)$ linearly ramps downward at a rate of $(V_{out}-V_{in})/L$. Furthermore, while the transistor 58 is "off", LOOP_CONTROL_2=0 because there is no current flowing through the sense resistor 54.

Next, in response to the next active edge of the oscillator signal OSC from the oscillator 21, the switching controller 26 generates a logic-low level for SWITCH_DISCHARGE and a logic-high level for SWITCH_CHARGE, and the ramp generator 22 restarts the sawtooth wave SAWTOOTH (these actions cause SWITCHING_CONTROL to transition to a logic-low level) such that the above-described cycle repeats.

In summary, during a continuous PWM mode, in a steady state, the ramp generator 22 and the second control loop 30 cause the inductor current $I_{Inductor}(t)$ to rise from an initial value $I_o$ to a peak value $I_{peak\_PWM\_continuous}$ during a portion $T_{on\_PWM\_continuous}$ of the continuous PWM switching period $T_{PWM\_continuous}$, and cause the current $I_{Inductor}(t)$ to fall from $I_{peak\_PWM\_continuous}$ to $I_o$ during a portion $T_{off\_PWM\_continuous}=T_{PWM\_continuous}-T_{on\_PWM\_continuous}$ of the switching period $T_{PWM\_continuous}$. And, because during $T_{on\_PWM\_continuous}$ $I_{Inductor}(t)$ is increasing, it is sometimes said that this is charging the magnetic field generated in the core of the inductor 16; therefore, during $T_{on\_PWM\_continuous}$, one may refer to the current $I_{Inductor}(t)$ as a "charge" or "charging" current. Likewise, because during $T_{off\_PWM\_continuous}$ $I_{Inductor}(t)$ is decreasing, it is sometimes said that this is discharging the magnetic field generated in the core of the inductor 16; therefore, during $T_{off\_PWM\_continuous}$, one may refer to the current $I_{Inductor}(t)$ as a "discharge" or "discharging" current.

Furthermore, during a continuous PWM mode, the boost converter 10 switches with a duty cycle $D_{PWM\_continuous}$ given by the following equation:

$$D_{PWM\_continuous} = T_{on\_PWM\_continuous} \Big/ \left( T_{on\_PWM\_continuous} + T_{off\_PWM\_continuous} \right) = (V_{out} - V_{in}) / V_{out} \tag{6}$$

Moreover, during a continuous PWM mode, the boost gain $V_{out}/V_{in}$ of the boost converter 10 is given by the following equation:

$$V_{out}/V_{in}=1/(1-D_{PWM\_continuous}) \tag{7}$$

Still referring to FIGS. 1 and 2, during the above-described continuous-PWM-mode switching cycle, the first control loop 28 of the boost converter 10 acts to drive $V_{out}$ toward $$V_{ref}\cdot\frac{R_{44}+R_{46}}{R_{46}}$$

during load transients, and to maintain the average value of $V_{out}$ during each cycle to be equal to $$V_{ref}\cdot\frac{R_{44}+R_{46}}{R_{46}}$$

during a steady-state condition of the load 12.

For example, suppose that during a continuous PWM mode, the load 12 significantly reduces the current $I_{Load}(t)$ that it draws over a relatively short period of time; this is sometimes called a load-release transient. Because the control loop 28 has a finite bandwidth and the inductor current takes time to slew to a new level, the control circuitry 14 cannot generate $I_{out}(t)$ so that it instantaneously tracks this reduction in $I_{Load}(t)$; therefore, the excess amount of $I_{out}(t)$ flows into and charges the filter capacitor 20, and thus causes $V_{out}$ to rise above $$V_{ref} \cdot \frac{R_{44} + R_{46}}{R_{46}}.$$

This increase in $V_{out}$ causes the voltage at the inverting node of the amplifier 38 to increase above $V_{ref}$, and, therefore, causes the amplifier to sink a current into its output node, thus discharging the capacitors 48 and 50 of the network 42, generating a negative voltage across resistor 52, and causing the level of the voltage LOOP_CONTROL_1 to fall. This decrease in LOOP_CONTROL_1 allows the sum of the voltage signals SAWTOOTH and LOOP_CONTROL_2 to exceed LOOP_CONTROL_1 in a shorter time during the continuous-PWM-mode switching period $T_{PWM\_continuous}$, and, therefore, causes a reduction in the duty cycle $D_{PWM\_continuous}$; and because $T_{PWM\_continuous}$ is fixed, a reduction in $D_{PWM\_continuous}$ causes a reduction in the on time $T_{on\_PWM\_continuous}$ of the transistor 58. And this reduction in the duty cycle $D_{PWM\_continuous}$ also reduces the peak of the inductor current $I_{Inductor}(t)=I_{out}(t)$, and increases the amount of time during which the inductor current can discharge before the end of the cycle. Together with the load, which will act to pull $V_{out}$ down, this allows $V_{out}$ to decrease toward $$V_{ref} \cdot \frac{R_{44} + R_{46}}{R_{46}}.$$

When $V_{out}$ approximately equals $$V_{ref} \cdot \frac{R_{44} + R_{46}}{R_{46}},$$

the first control loop 28 will recover, with the amplifier 38 ultimately holding the level of the voltage LOOP_CONTROL_1 steady at a new value, to maintain $V_{out}$ approximately equal to $$V_{ref} \cdot \frac{R_{44} + R_{46}}{R_{46}}.$$

Conversely, suppose that the load 12 significantly increases the current $I_{Load}(t)$ that it draws over a relatively short period of time; this is sometimes called a load-insertion transient. Because the control loop 28 has a finite bandwidth, and because the inductor current takes time to ramp to the new level, the control circuitry 14 cannot generate $I_{out}(t)$ so that it instantaneously tracks this increase in $I_{Load}(t)$; therefore, the filter capacitor 20 sources the excess amount of $I_{Load}(t)$, and, therefore, discharges, thus causing $V_{out}$ to fall below $$V_{ref} \cdot \frac{R_{44} + R_{46}}{R_{46}}.$$

This decrease in $V_{out}$ causes the voltage at the inverting node of the amplifier 38 to fall below $V_{ref}$, and, therefore, causes the amplifier to source a current from its output node, thus charging the capacitors 48 and 50 of the network 42 and forming a positive voltage across resistor 52, which causes the level of the voltage LOOP_CONTROL_1 to rise. This increase in LOOP_CONTROL_1 increases the portion of the switching period $T_{PWM\_continuous}$ required for the sum of the voltage signals SAWTOOTH and LOOP_CONTROL_2 to exceed the voltage signal LOOP_CONTROL_1, and, therefore, increases the duty cycle $D_{PWM\_continuous}$, i.e., the on time $T_{on\_PWM\_continuous}$ of the transistor 58. And this increase in the duty cycle $D_{PWM\_continuous}$ increases the peak inductor current $I_{peak\_PWM\_continuous}$ and, therefore, increases the peak of the inductor current $I_{Inductor}(t)=I_{out}(t)$. Once the increase is sufficient, this causes $V_{out}$ to increase toward $$V_{ref} \cdot \frac{R_{44} + R_{46}}{R_{46}}.$$

When $V_{out}$ approximately equals $$V_{ref} \cdot \frac{R_{44} + R_{46}}{R_{46}},$$

the first control loop 28 will recover, the amplifier 38 will stop sourcing an output current, and the control voltage LOOP_CONTROL_1 will ultimately stabilize and maintain $V_{out}$ approximately equal to $$V_{ref} \cdot \frac{R_{44} + R_{46}}{R_{46}}.$$

In summary, during a continuous PWM mode, in response to a transient in the load current $I_{Load}(t)$, the first control loop 28 drives $V_{out}$ toward $$V_{ref} \cdot \frac{R_{44} + R_{46}}{R_{46}},$$

and in response to a steady-state load current $I_{Load}(t)$, the first control loop maintains $V_{out}$ approximately equal to $$V_{ref} \cdot \frac{R_{44} + R_{46}}{R_{46}}.$$

Referring to FIGS. 1 and 3, operation of the boost converter 10 is described during a discontinuous PWM mode of operation, according to an embodiment.

During a discontinuous PWM mode, the inductor current $I_{Inductor}(t)=0$ for at least a portion $T_{zero\_inductor\_current}$ of the switching period $T_{PWM\_discontinuous}=T_{PWM\_continuous}$.

The operation of the boost converter 10 during a discontinuous PWM mode is similar to the operation of the boost converter during a continuous PWM mode as described above, with at least the following four differences.

First, the inductor current $I_{Inductor}(t)$ equals zero for the time $T_{zero\text{-}inductor\_current}$ before the switching controller 26, in response to the oscillator signal OSC, turns the transistor 58 on again; the current $I_{inductor}(t)$ equaling zero typically indicates that $I_{Load}(t)$ is less than it is during a continuous PWM mode.

Second, in response to $I_{inductor}(t)$ falling to zero (or even slightly below zero for a relatively short period of time), the output of the comparator 35 transitions from a logic-high level to a logic-low level.

Third, to prevent a reverse current from flowing from the filter capacitor 20 back through the transistor 60, the switching controller 26 turns off the transistor 60 in response to the logic-high-to-logic-low transition of the output of the comparator 35, which, per above, indicates that $I_{out}(t)=0$ such that both of the transistors 58 and 60 are off during the time $T_{zero\_inductor\_current}$.

And fourth, despite the zero-inductor-current time $T_{zero\_inductor\_current}$, the following equations, which are the counterparts to equations (6) and (7) above, hold true:

$$D_{PWM\_discontinuous}=T_{on\_PWM\_discontinuous}/(T_{on\_PWM\_discontinuous}+T_{off\_PWM\_discontinous})=(V_{out}-V_{in})/V_{out} \quad (8)$$

Moreover, during a discontinuous PWM mode, the boost gain $V_{out}/V_{in}$ of the boost converter 10 is given by the following equation:

$$V_{out}/V_{in}=1/(1-D_{PWM\_discontinuous}) \quad (9)$$

The boost converter 10 may remain in a discontinuous PWM mode during steady-state operation while the load 12 is too light for a continuous PWM mode but too heavy for a PFM mode. If the boost converter 10 is in a discontinuous PWM mode when the load 12 becomes light enough for a PFM mode, then the boost converter may transition from the discontinuous PWM mode to the PFM mode. And if the boost converter 10 is in a continuous PWM mode when the load 12 becomes light enough for a PFM mode, then the boost converter may transition from the continuous PWM mode, through a discontinuous PWM mode, and to the PFM mode. Similarly, if the boost converter 10 is in a PFM mode and the load 12 becomes heavy enough for the boost converter to operate in a discontinuous PWM mode, then the boost converter may transition from the PFM mode to the PWM mode. And if the boost converter 10 is in a PFM mode and the load 12 becomes heavy enough for the boost converter to operate in a continuous PWM mode, then the boost converter may transition from the PFM mode, through a discontinuous PWM mode, and to the continuous PWM mode.

Referring to FIGS. 1 and 4, operation of the boost converter 10 is described during a PFM mode of operation, according to an embodiment.

During a PFM mode, the switching frequency $f_{s\_PFM}$ and, therefore, the switching period $T_{PFM}=1/f_{s\_PFM}$, depend on the load 12; that is, as the load current $I_{Load}(t)$ increases, the switching frequency $f_{s\_PFM}$ increases and the switching period $T_{PFM}$ decreases, and as $I_{Load}(t)$ decreases, $f_{s\_PFM}$ decreases and $T_{PFM}$ increases.

As described above, the boost converter 10 is configured to enter the PFM mode during light-load conditions to increase conversion efficiency. Furthermore, the first and second control loops 28 and 30, and the oscillator 21, ramp generator 22, and summing comparator 24 may be disabled, e.g., to save power.

During $T_{PFM}$, while both the transistors 58 and 60 are off, the comparator 57 effectively monitors $V_{out}$.

Next, in response to $V_{out}$ falling below $$V_{ref}\cdot\frac{R_{44}+R_{46}}{R_{46}},$$

the comparator 57 transitions its output from a logic-low level to a logic-high level.

Then, in response to the logic-low-level-to-logic-high-level transition of the output of the comparator 57, the switching controller 26 turns on the transistor 58 and maintains the transistor 60 off such that a charging current $I_{Inductor}(t)$ flows through the inductor 16, the on transistor 58, and the sense resistor 54; the charging inductor current $I_{Inductor}(t)$ ramps upward per equation (3) with $I_o=0$.

While the voltage signal LOOP_CONTROL_2$=R_{54}\cdot I_{Inductor}<I_{peak_ref}$, the comparator 56 generates a logic-low level for LOOP_CONTROL_3, in response to which the switching controller 26 maintains the transistor 58 on and maintains the transistor 60 off.

Next, in response to LOOP_CONTROL_2$\geq I_{peak_ref}$, which will occur when $I_{inductor}$ exceeds $I_{peak\_PFM}=I_{peak\_ref}/R_{54}$, the comparator 56 generates a logic-high level for LOOP_CONTROL_3, in response to which the switching controller 26 turns off the transistor 58 and turns on the transistor 60 for a time $T_{off\_PFM}$ such that the inductor current $I_{Inductor}(t)=I_{out}(t)$ ramps downward according to the following equation:

$$I_{Inductor}(t)=I_{peak\_PFM}-((V_{out}-V_{in})/L)\cdot t \quad (10)$$

Then, in response to $I_{Inductor}(t)\leq 0$, the comparator 35 transitions its output from a logic-high level to a logic-low level, and in response to this logic-high-level-to-logic-low-level transition, the switching controller 26 turns off the transistor 60 to prevent a reverse discharge current $-I_{out}(t)$ from flowing from the capacitor 20, and back through the transistor 60.

The switching controller 26 maintains the transistors 58 and 60 off until the comparator 57 detects that $V_{out}$ has fallen below $$V_{ref}\cdot\frac{R_{44}+R_{46}}{R_{46}},$$

at which point the boost converter 10 repeats the above-described PFM cycle.

Consequently, because in a PFM mode the inductor current $I_{inductor}$ maintains a fixed waveform, the switching frequency $f_{s\_PFM}$ at which the switching controller 26 switches the transistors 58 and 60 is proportional to the load current $I_{Load}(t)$ such that $f_{s\_PFM}$ reduces with $I_{Load}(t)$, and, therefore, the boost converter 10 is more efficient because it delivers more energy per switching event than it would do in a discontinuous PWM mode at the same load level. The reduction in switching cycles results in less switching losses while taking advantage of the fact that at low inductor currents, conduction losses are small, which allows the boost converter 10 to operate with a higher conversion efficiency.

Referring to FIGS. 1-4, operation of the boost converter 10 is described during a transition from a continuous or discontinuous PWM mode to a PFM mode, and from a PFM mode to a continuous or discontinuous PWM mode, according to an embodiment. In the described embodiment, it is assumed that to transition from a continuous PWM mode to a PFM mode, the boost converter 10 first transitions to a discontinuous PWM mode and then transitions to the PFM mode; therefore, only a transition from a discontinuous PWM mode to a PFM mode is described below in detail. Likewise, it is assumed that to transition from a PFM mode to a continuous PWM mode, the boost converter 10 first transitions to a discontinuous PWM mode and then transitions to the continuous PWM mode; therefore, only a transition from a PFM mode to a discontinuous PWM mode is described below in detail.

During a discontinuous PWM mode, the control circuitry 14, using conventional circuitry that is omitted from FIG. 1, monitors either the peak $I_{peak\_PWM\_discontinuous}$ of the inductor current $I_{Inductor}$ or the average $I_{avg\_PWM\_discontinuous}$ of the inductor current $I_{Inductor}$, and transitions the boost converter 10 to the PFM mode when the monitored current is less than or equal to a set PWM-to-PFM threshold.

And during a PFM mode, the control circuitry 14, using conventional circuitry that is omitted from FIG. 1, monitors the PFM switching frequency $f_{s\_PFM}$, and transitions the boost converter 10 to a discontinuous PWM mode when $f_{s\_PFM}$ is greater than or equal to a set maximum PFM switching frequency threshold $f_{s\_PFM\_max}$. Alternatively, the control circuitry 14, using conventional circuitry that is omitted from FIG. 1, monitors $V_{out}$, and transitions the boost converter 10 to a discontinuous PWM mode when $V_{out}$ is less than or equal to a set minimum threshold.

Still referring to FIGS. 1-4, alternate embodiments of the boost converter 10 are contemplated. For example, the control loops 28, 30, 32, and 33 may include components other than those shown to stabilize these loops and the overall boost converter 10. Furthermore, the control circuit 14 may include a current-sense circuit other than the sense resistor 54.

Referring again to FIGS. 1-4, there may be some problems with the boost converter 10 and the way in which it operates.

For example, a first problem may be that upon a transition from a PFM mode to a discontinuous PWM mode, $V_{out}$ may experience a transient "glitch" while the first control loop 28, which the control circuitry 14 may deactivate during a PFM mode, reacquires a voltage level for LOOP_CONTROL_1 that causes $V_{out}$ to approximately equal $$V_{ref} \cdot \frac{R_{44} + R_{46}}{R_{46}}$$

(or some other multiple of $V_{ref}$).

A second problem may be that the output ripple voltage $V_{ripple}$ (not shown in FIGS. 1-4), which is superimposed on $V_{out}$ and is caused by the inductor current $I_{inductor}(t)$ ramping up and down and the effect of $I_{load}$ discharging $C_{out}$ during the time when $I_{inductor}$ is not delivering current to $V_{out}$, may depend heavily on quantities such as $V_{in}$ and $V_{out}$, and, therefore, may vary significantly with changes in $V_{in}$ and $V_{out}$.

And a third problem may be that transitioning from a discontinuous PWM mode to a PFM mode in response to sensing a peak, average, or other attribute of the inductor current $I_{Inductor}(t)$ may result in transitioning to a PFM mode at a relatively imprecise load point or a load point that varies from part to part, i.e., a load point that can be significantly different from a designed for or otherwise expected nominal transition load point, and may result in a varying hysteresis band, i.e., a band that is significantly different from a designed for or otherwise expected nominal hysteresis band. Because of this, the hysteresis band may need to be made larger than is theoretically needed. And, for a particular load, such a larger-than-needed hysteresis band may cause the boost converter 10 to sacrifice efficiency by remaining in a less-efficient mode at a load level within this larger-than-needed hysteresis band.

Figure 5:
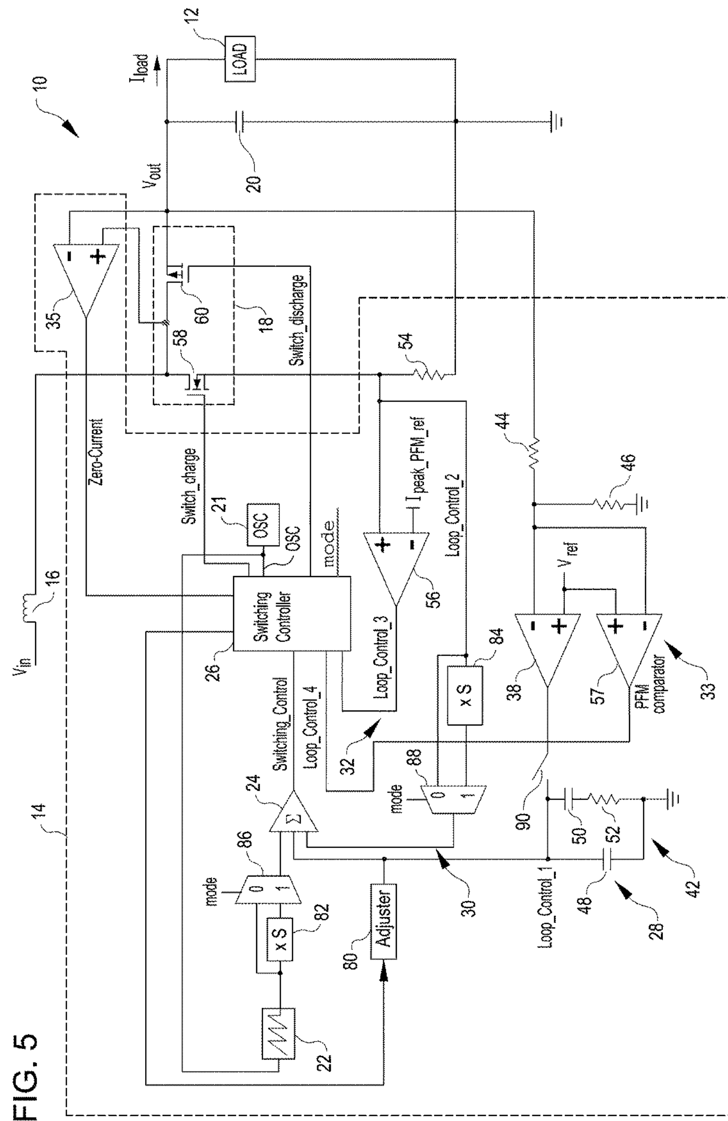
FIG. 5 diagram of a power supply that can transition more smoothly from the PFM mode to a PWM mode than the power supply of FIG. 1 can, and of a load that receives power from the power supply, according to an embodiment.
Figure 6:
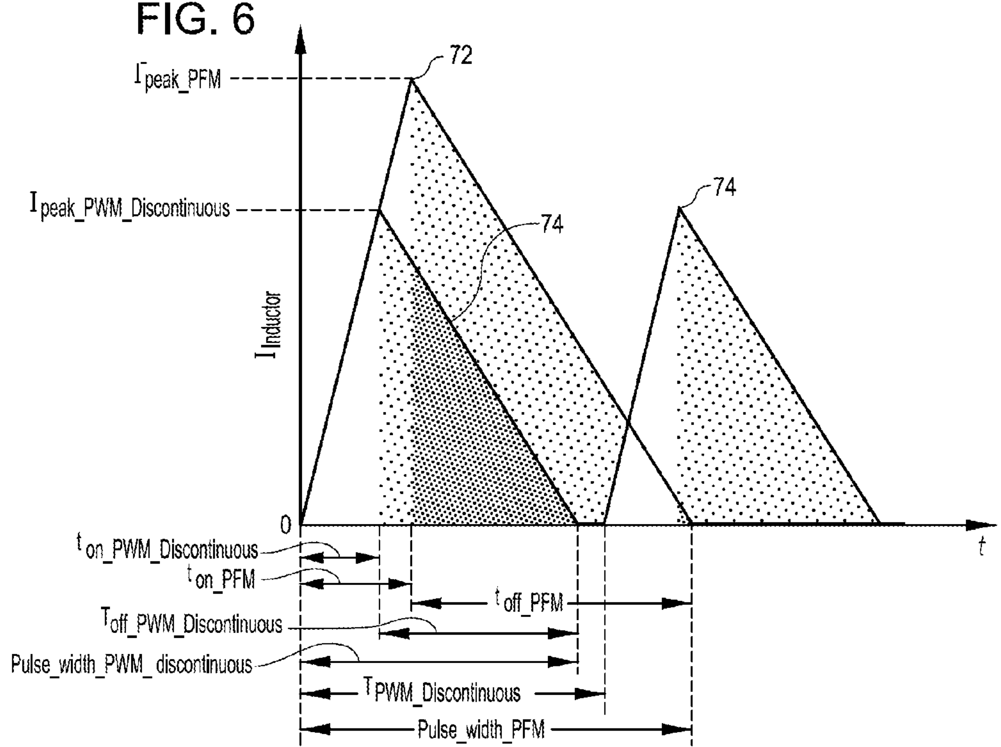
FIG. 6 is a plot of the inductor current of the power supply of FIG. 5 versus time just before and just after a transition from PFM mode to a discontinuous PWM mode, according to an embodiment.
Figure 7:
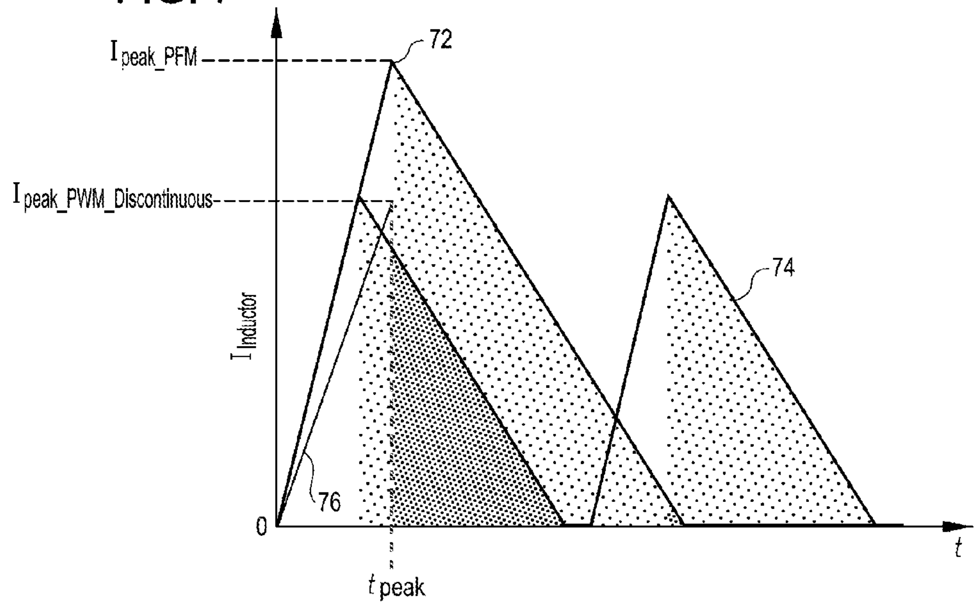
FIG. 7 is a plot of the inductor current of the power supply of FIG. 5 versus time just before and just after a transition from a PFM mode to a discontinuous PWM mode, and of a virtual inductor current that the power supply of FIG. 5 uses to poise a portion of the power supply for the transition, according to an embodiment.

Referring to FIGS. 5-7, a boost converter and techniques for mitigating at least the above-described first problem are described, according to an embodiment.

FIG. 5 is a diagram of a boost converter 70, which, according to an embodiment, is configured to poise at least one of its portions (e.g., a control loop) so that after a transition from a PFM mode to a discontinuous PWM mode, $V_{out}$ experiences little or no transition-induced transient amplitude change, or at least experiences a reduced transition-induced transient as compared to the boost converter 10 of FIG. 1.

FIG. 6 is a plot of an inductor current $I_{Inductor}(t)$ 72 versus time during a PFM mode just before a transition to a discontinuous PWM mode, and of an inductor current $I_{Inductor}(t)$ 74 versus time during a discontinuous PWM mode just after a transition from the PFM mode, according to an embodiment.

And FIG. 7 is the plot of FIG. 6 with the addition of a plot of a virtual discontinuous PWM inductor current $I_{Inductor}(t)$ 76 versus time; the boost converter 70 effectively uses this virtual current to poise the level of at least one control signal of the boost converter at a respective value that reduces or eliminates an amplitude "glitch" or transient that $V_{out}$ may otherwise experience in response to a PFM-to-discontinuous-PWM transition. The virtual discontinuous PWM inductor current $I_{Inductor}(t)$ 76 is further described below.

Referring to FIG. 5, the boost converter 70 is similar to the boost converter 10 of FIG. 1, where like numbers refer to components common to the boost converters 10 and 70, according to an embodiment.

But in addition to the components included in the boost converter 10, the boost converter 70 includes a control-signal adjuster 80, multipliers 82 and 84, multiplexers 86 and 88, and a switch 90.

The control-signal adjuster 80 has an input node coupled to the switching controller 26 and an output node coupled to the network 42. During a PFM mode, the control-signal adjuster 80 is configured to impart to the network 42 a condition (here a voltage level) that the network would have if the boost converter 70 were operating in a discontinuous PWM mode just after a PFM-to-discontinuous-PWM transition. For example, the adjuster 80 can include a digital-to-analog converter (DAC) or a charge pump that is configured to impart to the network 42 a voltage level that the voltage signal LOOP_CONTROL_1 would approximately have if the boost converter 70 were operating in a discontinuous PWM mode at the load current $I_{Load}(t)$ at which the PFM-to-discontinuous-PWM transition will occur (as will be described in more detail below). As described below, by maintaining the voltage level of LOOP_CONTROL_1 before a PFM-to-discontinuous-PWM transition approximately equal to the voltage level that LOOP_CONTROL_1 would have just after the PFM-to-discontinuous-PWM transition if the boost converter 70 were operating in a discontinuous PWM mode at the exit current, the first control loop 28 is poised to maintain $V_{out}$ at its regulated level after a PFM-to-discontinuous-PWM transition with a reduction (as compared to the boost converter 10 of FIG. 1) or elimination of a transient caused by the first control loop needing to reacquire the full level of LOOP_CONTROL_1 in response to such a transition.

The multipliers 82 and 84 are respectively configured to scale the voltage signals SAWTOOTH and LOOP_CONTROL_2 by a scale factor S, and the multiplexers 86 and 88 are respectively configured to couple the unscaled versions of SAWTOOTH and LOOP_CONTROL_2 to the summing amplifier 24 during continuous and discontinuous PWM modes and to couple the scaled versions of SAWTOOTH and LOOP_CONTROL_2 to the summing amplifier during a PFM mode. The determination of a value of the scale factor S is described below in conjunction with FIG. 6, according to an embodiment.

And the switch 90 is configured to couple the amplifier 38 to the network 42 during continuous and discontinuous PWM modes, and to uncouple the network 42 from the amplifier 38 during a PFM mode. Such uncoupling allows the control-signal adjuster 80 to set the level of the voltage LOOP_CONTROL_1 during a PFM mode without interference from the amplifier 38—in continuous and discontinuous PWM modes, the control-signal adjuster is disabled, and has no impact on the level of the voltage LOOP_CONTROL_1.

According to an embodiment, the scale factor S is set to the ratio of the peak inductor current $I_{peak\_PWM\_discontinuous}$ to the peak inductor current $I_{peak\_PFM}$, where $I_{peak\_PWM\_discontinuous}$ is the peak current through the inductor 16 during a discontinuous PWM mode just after a PFM-to-discontinuous-PWM transition, and $I_{peak\_PFM}$ is the peak current through the inductor during a PFM mode just before the PFM-to-discontinuous-PWM transition. That is:

$$S=I_{peak\_PWM\_discontinous}/I_{peak\_PFM} \quad (11)$$

such that $$S\cdot\text{LOOP\_CONTROL\_2}@I_{peak\_PFM}=\text{LOOP\_CONTROL\_2}@I_{peak\_PWM\_discontinuous} \quad (12)$$

By scaling both SAWTOOTH and LOOP_CONTROL_2 by S during a PFM mode, the control-signal adjuster 80, in response to the switching controller 26, can set the value of LOOP_CONTROL_1 such that LOOP_CONTROL_1 causes SWITCHING_CONTROL to transition at approximately the same time that it would have if the boost converter 70 were operating in a discontinuous PWM mode just after a PFM-to-discontinuous-PWM transition. That is, so scaling SAWTOOTH and LOOP_CONTROL_2 by S and so setting the value of LOOP_CONTROL_1 causes LOOP_CONTROL_1 to have approximately the amplitude, and SWITCHING_CONTROL to have approximately the transition timing, that these signals need to maintain $V_{out}$ in regulation just after a PFM-to-discontinuous-PWM transition.

Referring to FIGS. 5-6, the determination of the value S is described, according to an embodiment.

Although throughout a PFM mode the value of the peak $I_{peak\_PFM}$ of the inductor current $I_{Inductor}(t)$ is known by inspection to be equal to $I_{peak\_ref}/R_{54}$ [$R_{54}$ is the value of resistor 54 and $I_{peak\_ref}$ is a reference voltage that is input to the inverting input node of the comparator 56 during a PFM mode as described above in conjunction with FIGS. 1-4] the value of $I_{peak\_PWM\_discontinuous}$ depends on the load 12; therefore, because $I_{peak\_PWM\_discontinuous}$ may not have a known value, one typically cannot determine a value for S using equation (11) because the value of $I_{peak\_PWM\_discontinous}$ is not predictable while the boost converter 70 is in the PFM mode.

Consequently, to determine S, one can make the following assumptions.

First, the switching frequency $f_{s\_PWM\_discontinuous}$ of the boost converter 70 during a discontinuous PWM mode has a known fixed value; in contrast, the switching frequency $f_{s\_PFM}$ during a PFM mode depends on the load 12 and, therefore, does not have a known fixed value.

Second, because $f_{s\_PFM}$ is the switching frequency of the boost converter 70 during a PFM mode, just before a PFM-to-discontinuous-PWM transition $f_{s\_PFM}$ has its highest frequency, which hereinafter is called the "maximum PFM frequency" $f_{s\_PFM\_max}$.

Third, the load current $I_{Load}(t)$ just before the PFM-to-discontinuous-PWM transition approximately equals $I_{Load}(t)$ just after the PFM-to-discontinuous-PWM transition.

Fourth, because $I_{Load}(t)$ is assumed to be approximately the same before and after the PFM-to-discontinuous-PWM transition, to provide a smooth transition with little or no transition-induced transient on $V_{out}$, the charge that the boost converter 70 delivers to the load 12 per PFM period $T_{PFM}$ at the max switching frequency $f_{s\_PFM\_max}$ immediately before the PFM-to-discontinuous-PWM transition is assumed to be approximately the same as the average charge delivered to the load per the same time $T_{PFM}$ immediately after the PFM-to-discontinuous-PWM transition.

Fifth, $V_{in}$, $V_{out}$, and L are assumed to have the same values just before and just after the PFM-to-discontinuous-PWM transition.

And sixth, $f_{s\_PWM\_discontinuous}$ and $f_{s\_PFM\_max}$ are related by the following equations:

$$f_{s\_PWM\_discontinuous}=f_{s\_PFM\_max}\cdot N \quad (13)$$

$$f_{s\_PWM\_discontinuous}/f_{s\_PFM\_max}=N \quad (14)$$

where N is any real number that is greater than unity.

Based at least in part on these assumptions, one can derive a relationship between $I_{peak\_PFM}$ immediately before the PFM-to-discontinuous-PWM transition and $I_{peak\_PWM\_discontinuous}$ immediately after the PFM-to-discontinuous-PWM transition as follows.

Due to the linear slewing of the inductor current, the charge delivered to the combination of the load 12 and the output capacitor 20 during a PFM pulse at $f_{s\_PFM\_max}$ is the average current $I_{avg\_out}$ that flows into the output capacitor and the load multiplied by the time $t_{off\_PFM}$ that the output current $I_{out}$ is flowing into the output capacitor and load. Therefore, this per-PFM-pulse charge $Q_{PFM\_pulse}$ is given by the following equation:

$$Q_{PFM\_pulse}=\tfrac{1}{2}\cdot I_{peak\_PFM}\cdot t_{off\_PFM} \quad (15)$$

Therefore, the average charge per second, i.e., the average current, $I_{avg\_PFM}$ delivered to the combination of the output capacitor 20 and the load 12 during the PFM switching period $T_{PFM}$ is given by the following equation:

$$I_{avg\_PFM}=Q_{PFM\_pulse}/T_{PFM}=\tfrac{1}{2}\cdot I_{peak\_PFM}\cdot t_{off\_PFM}/T_{PFM} \quad (16)$$

Similarly, the average charge per second, i.e., the average current, $I_{avg\_PWM\_discontinuous}$ delivered to the combination of the output capacitor 20 and the load 12 in a discontinuous PWM mode during a discontinuous-PWM switching period $T_{PWM\_discontinuous}$ immediately after the PFM-to-discontinuous-PWM transition can be calculated using a similar approach, and is given by the following equation:

$$I_{avg\_PWM\_discontinuous} = Q_{PWM\_pulse\_discontinuous} / T_{PWM\_discontinuous} = (1/2 \cdot I_{peak\_PWM\_discontinuous} \cdot t_{off\_PWM\_discontinuous}) / T_{PWM\_discontinuous} \quad (17)$$

But from equation (14), equation (17) may be written as:

$$I_{avg\_PWM\_discontinuous} = Q_{PWM\_pulse\_discontinuous} / T_{PWM\_discontinuous} = (\tfrac{1}{2} \cdot I_{peak\_PWM\_discontinuous} \cdot t_{off\_PWM\_discontinuous}) / (T_{PFM}/N) \quad (18)$$

As stated above, because it is assumed that $I_{avg\_PFM}$ just before a PFM-to-discontinuous-PWM transition equals $I_{avg\_PWM\_discontinuous}$ just after such transition, one can obtain the following equality from equations (16) and (18):

$$\tfrac{1}{2} \cdot I_{peak\_PFM} \cdot t_{off\_PFM} / T_{PFM} = \tfrac{1}{2} \cdot I_{peak\_PWM\_discontinuous} \cdot t_{off\_PWM\_discontinuous} / (T_{PFM}/N) \quad (19)$$

Rearranging terms in equation (19) yields:

$$\tfrac{1}{2} \cdot I_{peak\_PFM} \cdot t_{off\_PFM}) / T_{PFM} = \tfrac{1}{2} \cdot N \cdot I_{peak\_PWM\_discontinuous} \cdot t_{off\_PWM\_discontinuous} / T_{PFM} \quad (20)$$

Because $V_{in}$, $V_{out}$, and L can be assumed to be the same just before and just after a PFM-to-discontinuous-PWM transition per above, $t_{off\_PFM}$ and $t_{off\_PWM\_discontinuous}$ are represented, respectively, by the following equations:

$$t_{off\_PFM} = I_{peak\_PFM} \cdot L / (V_{out} - V_{in}) \quad (21)$$

$$t_{off\_PWM\_discontinuous} = I_{peak\_PWM\_discontinuous} \cdot L / (V_{out} - V_{in}) \quad (22)$$

Substituting the values of $t_{off\_PFM}$ and $t_{off\_PWM\_discontinuous}$ from equations (21) and (22) into equation (20) yields the following equation:

$$\tfrac{1}{2} \cdot I_{peak\_PFM} \cdot I_{peak\_PFM} \cdot L / (V_{out} - V_{in}) / T_{PFM} = \tfrac{1}{2} \cdot N \cdot I_{peak\_PWM\_discontinuous} \cdot I_{peak\_PWM\_discontinuous} \cdot L / (V_{out} - V_{in}) / T_{PFM} \quad (23)$$

Cancelling the common terms in equation (23) yields the following equation:

$$I_{peak\_PFM}^2 = N \cdot I_{peak\_PWM\_discontinuous}^2 \quad (24)$$

And taking the square root of both sides of equation (24) and rearranging the terms yields the following relations between $I_{peak\_PFM}$ just before a PFM-to-discontinuous-PWM transition and $I_{peak\_PWM\_discontinuous}$ just after the PFM-to-discontinuous-PWM transition:

$$I_{peak\_PWM\_discontinuous} = I_{peak\_PFM} / \sqrt{N} \quad (25)$$

$$I_{peak\_PWM\_disconstinuous} / I_{peak\_PFM} = S = \frac{1}{\sqrt{N}} \quad (26)$$

Consequently, setting S equal to one over the square root of the ratio of the PFM_max and discontinuous-PWM frequencies just before and just after a PFM-to-discontinuous-PWM transition allows the boost converter 70 to poise itself, specifically to poise the voltage signal LOOP_CONTROL_1, for a smooth transition from a PFM mode to a discontinuous PWM mode such that there is minimal or no transition-induced transient on $V_{out}$. Such poising of LOOP_CONTROL_1 is described in more detail below.

Referring to FIGS. 5-7, the operations of the boost converter 70 during a PFM mode, and just before, during, and just after a PFM-to-discontinuous-PWM transition, are described, according to an embodiment.

During a PFM mode, the switching controller 26, in response to the control loops 32 and 33, maintains $V_{out}$ at approximately its regulated value of $$V_{ref} \cdot \frac{R_{44} + R_{46}}{R_{46}}$$

by driving the switching circuitry 18 at a switching frequency $f_{s\_PFM}$, which depends on the load 12, so as to generate to the inductor current $I_{Inductor}(t)$ 72 in a manner similar to that described above in conjunction with FIGS. 1 and 4.

Furthermore, the control circuitry 14 opens the switch 90 to uncouple the loop-filter network 42 from the amplifier 38, and generates a signal MODE (e.g., the switching controller 26 may open the switch and generate the signal MODE as shown in FIG. 5), which causes the multiplexers 86 and 88 to couple to the summing comparator 24 the scaled voltage signals S•SAWTOOTH and S•LOOP_CONTROL_2 from the multipliers 82 and 84, respectively. Per equation (26), $$S = \frac{1}{\sqrt{N}},$$

where $N = f_{s\_PWM\_discontinuous} / f_{s\_PFM\_max}$ per equation (14). Note that in an embodiment, $f_{s\_PWM\_discontinuous}$ is equal with the frequency of the oscillator (OSC) and N is a constant.

Referring to FIGS. 5 and 7, scaling the voltage signals SAWTOOTH and LOOP_CONTROL_2 by S causes, at least theoretically, the control loop 30 to "see" the inductor current $I_{Inductor}(t)$ as being equal to $I_{peak\_PWM\_discontinuous} = I_{peak\_PFM}/\sqrt{N}$ at a time $t_{peak}$ when $I_{Inductor}(t)$ actually equals $I_{peak\_PFM}$; therefore, at least theoretically (for example, when $f_{s\_PWM\_discontinuous} = f_{s\_PFM\_max}$), the control loop 30 "sees" $I_{Inductor}$ (t) 76, the peak $I_{peak\_PWM\_discontinuous}$ of which occurs at the same time $t_{peak}$ as the peak $I_{peak\_PFM}$ of the actual PFM inductor current $I_{Inductor}(t)$ 72. Because $I_{Inductor}$ (t) 76 is not actually flowing through the filter inductor 16 (the inductor current $I_{Inductor}(t)$ 72 is the current actually flowing through the filter inductor), $I_{Inductor}(t)$ 76 is hereinafter referred to as a "virtual" inductor current.

If the virtual inductor current $I_{Inductor}(t)$ 76 were the actual inductor current flowing through the filter inductor 16 at time $t_{peak}$, then the voltage signals LOOP_CONTROL_1, S•LOOP_CONTROL_2, and S•SAWTOOTH would have, at the time $t_{peak}$, respective values that would cause the signal SWITCHING_CONTROL to transition to a logic-high level so as to cause the switching controller 26 to turn off the transistor 58 and turn on the transistor 60 so that a discharging current $I_{inductor}(t)$ (this discharging current is not shown in FIG. 7) could flow through the transistor 60 and toward the load 12.

Although the values of the voltage signals S•SAWTOOTH and S•LOOP_CONTROL_2 are set by the multipliers 82 and 84, respectively, the value of LOOP_CONTROL_1 is free to be set by the adjuster 80 by virtue of the switch 90 "breaking" the first control loop 28, i.e., by virtue of the switch 90 uncoupling the network 42 from the amplifier 38.

Consequently, in response to the switching controller 26, the adjuster 80 adjusts the level of the voltage signal LOOP_CONTROL_1 such that the voltage signal SWITCHING_CONTROL transitions from a logic-low level to a logic-high level at $t_{peak}$.

The switching controller 26 causes the adjuster 80 to adjust the value of LOOP_CONTROL_1, in an iterative, way depending on whether the logic-low-to-logic-high transition of SWITCHING_CONTROL occurs before, at the same time as, or after (theoretically) the time $t_{peak}$, which is the time that the comparator 56 of the control loop 32 transitions LOOP_CONTROL_3 from a logic-low level to a logic-high level.

If the logic-low-to-logic-high transition of SWITCHING_CONTROL occurs before the logic-low-to-logic-high transition of LOOP_CONTROL_3, then the switching controller 26 determines that the voltage level of LOOP_CONTROL_1 is too low, and causes the adjuster 80 to increase the voltage level of LOOP_CONTROL_1. For example, the switching controller 26 may include, or may have access to, a counter (not shown in FIG. 5), and may start the counter counting upward from a known initial value (e.g., 0) in response to the logic-low-to-logic-high transition of SWITCHING_CONTROL_, and stop the counter in response to the logic-low-to-logic-high transition of LOOP_CONTROL_3. Then, the switching controller 26 may cause the adjuster 80 to increase the value of LOOP_CONTROL_1 by an amount that is proportional to the count value. The factor of proportionality between the count value and the amount by which the adjuster 80 increases the value of LOOP_CONTROL_1 can be selected to impart a determined level of stability to the adjustment loop formed, in part, by the switching controller 26 and the adjuster 80. The switching controller 26 may continue to cause the adjuster 80 to increase the value of LOOP_CONTROL_1 once each PFM cycle until the logic-low-to-logic-high transition of SWITCHING_CONTROL no longer occurs before the logic-low-to-logic-high transition of LOOP_CONTROL_3.

If the logic-low-to-logic-high transition of SWITCHING_CONTROL occurs at approximately the same time as the logic-low-to-logic-high transition of LOOP_CONTROL_3, then the switching controller 26 determines that LOOP_CONTROL_1 has a proper level, and, therefore, causes the adjuster 80 to hold the level of LOOP_CONTROL_1 at its current value. For example, if the above-described count value is less than a selected threshold, then the switching controller 26 may "decide" not to alter the level of LOOP_CONTROL_1.

Because in response to the switching controller 26 turning off the transistor 58 the level of LOOP_CONTROL_2 drops to zero, if the level of LOOP_CONTROL_1 is too high, then the switching controller will not transition SWITCHING_CONTROL from a logic-low level to a logic-high level due to the sum S•LOOP_CONTROL_2 and S•SAWTOOTH never exceeding LOOP_CONTROL_1.

Consequently, if the switching controller 26 detects a logic-low-to-logic-high transition of LOOP_CONTROL_3 without detecting a corresponding logic-low-to-logic-high transition of SWITCHING_CONTROL, then the switching controller determines that the level of LOOP_CONTROL_1 is too high, and causes the adjuster 80 to decrease the level of LOOP_CONTROL_1. For example, the switching controller 26 may decrease the value of LOOP_CONTROL_1 by a fixed amount that is selected to impart a determined level of stability to the adjustment loop formed, in part, by the switching controller and the adjuster 80. The switching controller 26 may continue to cause the adjuster 80 to decrease the value of LOOP_CONTROL_1 once each PFM cycle until the logic-low-to-logic-high transition of SWITCHING_CONTROL occurs at the same time as, or slightly before, the logic-low-to-logic-high transition of LOOP_CONTROL_3.

By operating in the above-described iterative manner, the switching controller 26 and adjuster 80 poise the level of LOOP_CONTROL_1 for the correct inductor current $I_{inductor}$ in the inductor 16 to maintain $V_{out}$ approximately equal to $$V_{ref} \cdot \frac{R_{44} + R_{46}}{R_{46}}$$

in a discontinuous PWM mode just after a PFM-to-discontinuous-PWM transition of the boost converter 70.

Still referring to FIGS. 5 and 7, the switching controller 26 monitors the switching frequency $f_{s\_PFM}$ during a PFM mode. For example, the switching controller 26 may monitor $f_{s\_PFM}$ by monitoring the frequency at which it switches the transistors 58 and 60, or may use an oscillator (which may be the same as, or different from, the oscillator 21 in FIG. 5) that limits the frequency to a known maximum value, corresponding to $f_{s\_PFM}/N$.

In response to $f_{s\_PFM}$ approaching, equaling, or exceeding $f_{s\_PFM\_max}$, the switching controller 26 causes the boost converter 70 to transition from a PFM mode to a discontinuous PWM mode. The switching controller 26 performs this transition, at least in part, by ignoring the signals LOOP_CONTROL_3 and LOOP_CONTROL_4, setting the multiplexers 82 and 84 so that they couple the unscaled versions of SAWTOOTH and LOOP_CONTROL_2, respectively, to the summing comparator 24, disabling the adjuster 80, closing the switch 90 so as to "close" the first control loop 28, and controlling the switching stage 18 in response to the signal SWITCHING_CONTROL.

Still referring to FIGS. 5-7, alternate embodiments of the boost converter 70 are contemplated. For example, alternate embodiments of the boost converter 10 of FIG. 1 may be applicable to the boost converter 70. Furthermore, the switching controller 26 may determine that the adjuster 80 is not to adjust the level of LOOP_CONTROL_1 every PFM cycle, but is to do so every m PFM cycles to reduce power consumption, where m is an integer and m>1. Moreover, the switching controller 26 may determine that the adjuster 80 is to adjust the level of LOOP_CONTROL_1 during the PFM mode regardless of the PFM switching frequency, or the switching controller may determine that the adjuster is to adjust the level of LOOP_CONTROL_1 during the PFM mode only when the PFM switching frequency is greater than a predetermined threshold, or is within a predetermined range of the maximum PFM switching frequency PFM_max (i.e., within a predetermined range of the PFM-to-discontinuous-PWM transition frequency). In addition, the scale factor S may have a suitable value other than $$\frac{1}{\sqrt{N}}.$$

Referring to FIGS. 8-13, described below is an embodiment of a technique for addressing the above-described second possible problem with the boost converter 10 of FIG. 1, which possible problem is that the output ripple voltage $V_{ripple}$ in PFM mode may depend heavily on quantities such as $V_{in}$ and $V_{out}$, and thus may be relatively variable over a range of $V_{in}$, or from boost converter to boost converter with different $V_{out}$.

Figure 8:
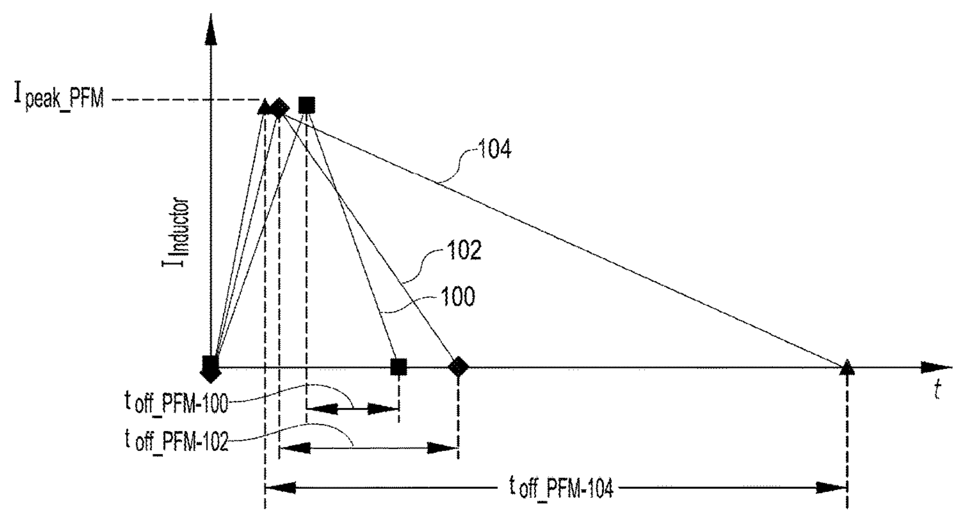
FIG. 8 is a number of plots of the inductor current of the power supply of FIG. 1 versus time during a PFM mode for a number of input-signal levels, according to an embodiment.

FIG. 8 is a plot of PFM pulses 100, 102, and 104 (i.e., a PFM pulse is the inductor current $I_{Iinductor}(t)$ during the period $t_{on\_PFM}$ $t_{off\_PFM}$) generated by the boost converter 10 of FIG. 1 during a PFM mode for three different levels of $V_{in}$, according to an embodiment, where $I_{peak\_PFM}$ is fixed as described above in conjunction with FIGS. 1 and 4, and where $V_{in}$ is approximately 50% of $V_{out}$ for the pulse 100, approximately 75% of $V_{out}$ for the pulse 102, and approximately 92% of $V_{out}$ for the pulse 104.

Figure 9:
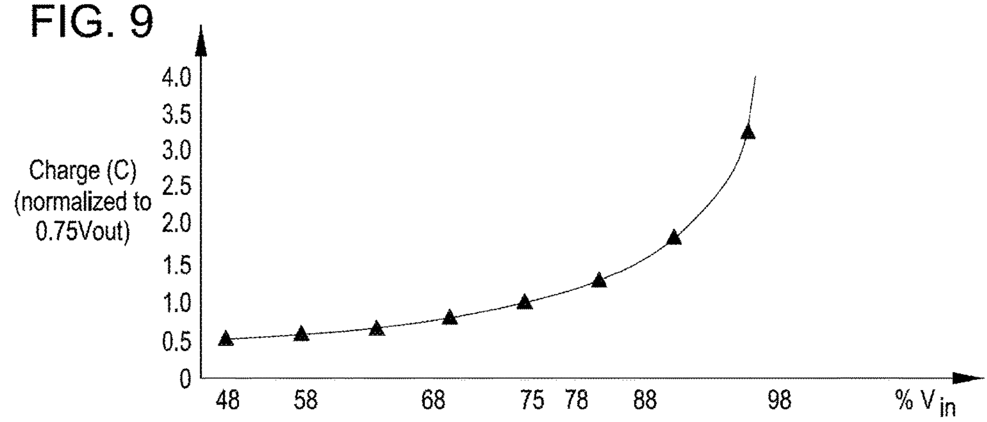
FIG. 9 is a plot of the normalized amount of charge that the power supply of FIG. 1 delivers to the load per cycle in a PFM mode versus the input-signal level, according to an embodiment.

FIG. 9 is a plot of the charge per PFM pulse that the boost converter 10 of FIG. 1 delivers to the load 12 of FIG. 1 during a PFM mode versus $V_{in}$, according to an embodiment, where $I_{peak\_PFM}$ is fixed as described above in conjunction with FIGS. 1 and 4.

Figure 10:
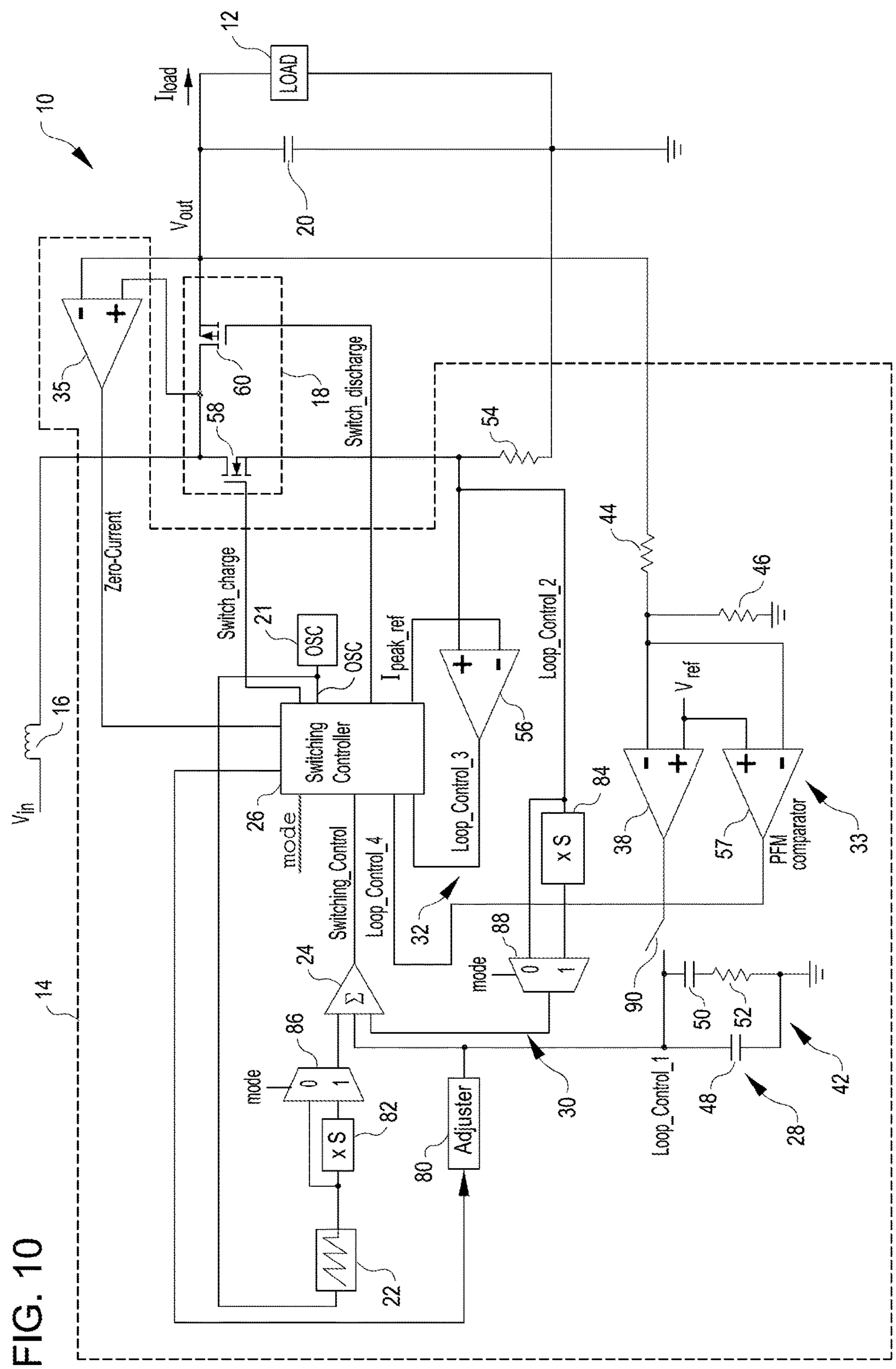
FIG. 10 is diagram of a power supply that can transition from the PWM mode to the PFM mode more accurately than the power supplies of FIGS. 1 and 5 can, and of a load that receives power from the power supply, according to an embodiment.

FIG. 10 is a diagram of a boost converter 110, which is configured to reduce the dependency of $V_{ripple}$ on at least one of $V_{in}$ and $V_{out}$, according to an embodiment.

Figure 11:
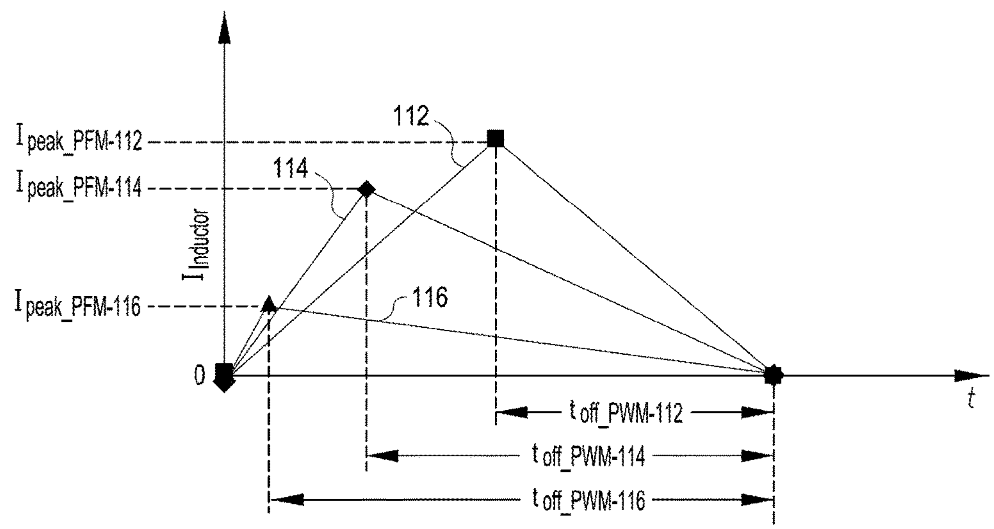
FIG. 11 is a number of plots of the inductor current of the power supply of FIG. 10 versus time during a PFM mode for a number of input-signal levels, according to an embodiment.

FIG. 11 is a plot of PFM pulses 112, 114, and 116 generated by the boost converter 110 of FIG. 10 during a PFM mode for different levels of $V_{in}$, according to an embodiment, where $V_{in}$ is approximately 50% of $V_{out}$ for the pulse 112, approximately 75% of $V_{out}$ for the pulse 114, and approximately 92% of $V_{out}$ for the pulse 116.

Figure 12:
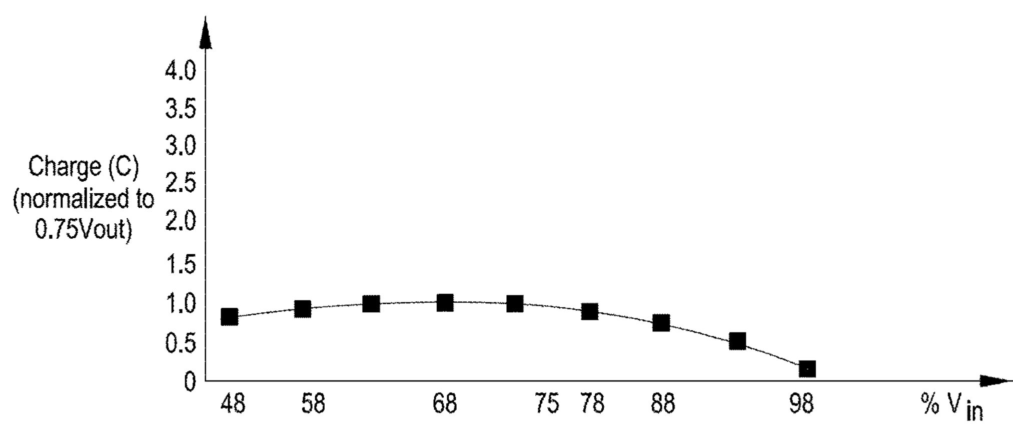
FIG. 12 is a plot of the normalized amount of charge that the power supply of FIG. 10 delivers to the load per cycle in a PFM mode versus the input-signal level, according to an embodiment.

FIG. 12 is a plot of the charge per PFM pulse that the boost converter 110 of FIG. 10 delivers during a PFM mode versus $V_{in}$, according to an embodiment, where the PFM pulse width $t_{on\_PFM}+t_{off\_PFM}$ is approximately constant.

Figure 13:
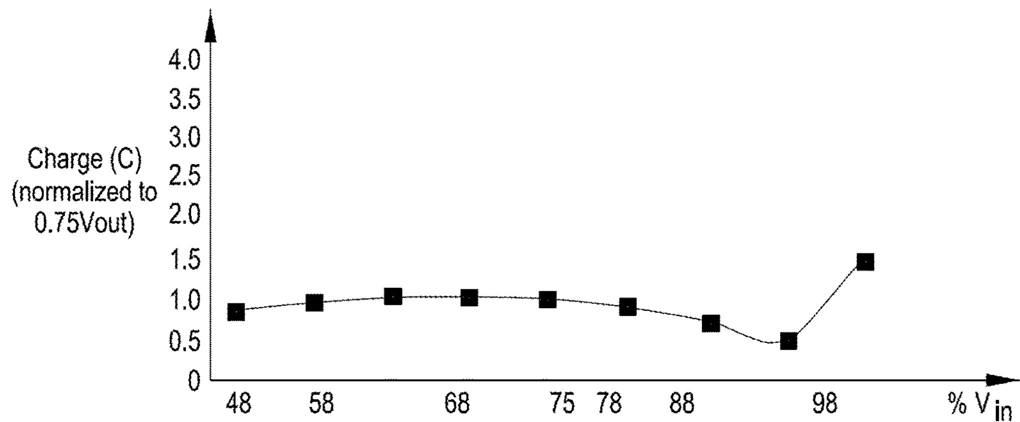
FIG. 13 is a plot of the normalized amount of charge that the power supply of FIG. 10 delivers to the load per cycle in a PFM mode versus the input-signal level, according to another embodiment.

FIG. 13 is a plot of the charge per PFM pulse that the boost converter 110 of FIG. 10 delivers during a PFM mode versus $V_{in}$, according to another embodiment, where the PFM pulse width $t_{on\_PFM}+t_{off\_PFM}$ is allowed to become longer at relatively high values of $V_{in}$ so as to maintain $t_{on\_PFM}$ at least as long a selected threshold time.

Referring to FIGS. 1 and 8, because the boost converter 10 limits the peak of the inductor current $I_{Inductor}(t)$ to $I_{peak\_ref}$ during a PFM mode, the amount of charge that the boost converter delivers to the combination of the output capacitor 20 and the load 12 during a PFM pulse may depend heavily on at least $V_{in}$ and $V_{out}$.

Referring to FIG. 8, as described above in conjunction with FIGS. 1-7, the amount of charge that the boost converter 10 delivers per PFM pulse is proportional to the area under a right-angled triangle having a hypotenuse formed by the linear ramping down of $I_{Inductor}(t)$ during $t_{off\_PFM}$.

It is evident from FIG. 8 that, for example, this area is inversely proportional to $V_{out}-V_{in}$.

Following is an explanation of the dependencies of the per-PFM-pulse charge on $V_{in}$ and $V_{out}$.

The peak inductor current $I_{peak\_PFM}$ during the PFM mode is known to be equal to $I_{Peak\_ref}/R_{54}$ as described above in conjunction with FIGS. 1-4; therefore, from equation (2), one can derive the following equations:

$$(V_{out}-V_{in})/L=(I_{Peak\_PFM}-0)/_{toff\_PFM} \quad (27)$$

$$t_{off\_PFM}=I_{peak\_PFM}\cdot L/(V_{out}-V_{in}) \quad (28)$$

Therefore, because $V_{in}$ is less than $V_{out}$ for the boost converter 10, $t_{off\_PFM}$ increases/decreases with an increase/decrease in $V_{in}$ (i.e., $t_{off\_PFM}$ follows $V_{in}$), and increases/decreases with a decrease/increase in $V_{out}$ (i.e., $t_{off\_PFM}$ inversely follows $V_{out}$).

Although $V_{out}$ is typically fixed for a particular instantiation of the boost converter 10 (except for boost converters, e.g., with digitally programmable output voltages), $V_{out}$ may change from instantiation to instantiation, thus possibly causing $V_{ripple}$ to be significantly different from instantiation to instantiation having the same or similar $V_{in}$.

$V_{in}$, however, may change not only from instantiation to instantiation of the boost converter 10, but also may change over time for a single instantiation of the boost converter 10, particularly if $V_{in}$ is supplied by a battery that alternately discharges and is charged, or is supplied alternately by a battery and a power supply or battery charger, such as an AC adapter.

Referring to FIGS. 1 and 9, it is evident that the amount of charge that the boost converter 10 delivers to the combination of the output capacitor 20 and the load 12 per PFM pulse increases exponentially as $V_{in}$ increases, assuming that $V_{out}$ is unchanging.

Unfortunately, changes in the amount of charge that the boost converter 10 delivers to the combination of the capacitor 20 and the load 12 per PFM pulse can cause a number of problems. For example, suppose that an instantiation of the boost converter 10 is designed to provide a particular output ripple voltage $V_{ripple}$ at a selected nominal input voltage $V_{in\_nominal}$. If $V_{in}$ increases significantly above $V_{in\_nominal}$, then although the PFM switching frequency $f_{s\_PFM}$ decreases, thus increasing the efficiency of the boost converter 10, $V_{ripple}$ increases significantly, and may become too large for some applications. Conversely, if $V_{in}$ decreases significantly below $V_{in\_nominal}$, then although $V_{ripple}$ decreases, the PFM switching frequency $f_{s\_PFM}$ increases, thus decreasing the efficiency of the boost converter 10 during a PFM mode in which high efficiency is coveted; that is, an application may be able to tolerate a higher $V_{ripple}$ to increase boost-converter efficiency during a PFM mode at this lower input voltage $V_{in}$.

FIG. 10 is a diagram of a boost converter 110, which is configured to reduce the dependence of the output voltage ripple $V_{ripple}$ on at least $V_{in}$ and $V_{out}$, according to an embodiment.

The boost converter 110 is similar to the boost converter 70 of FIG. 5, except that in the boost converter 110, the control circuit 14 is configured to adjust the level of the reference voltage $I_{peak\_ref}$ at the inverting input node of the comparator 56, and includes a PFM pulse-width determiner (not shown in FIG. 10). In the embodiment described below, the switching controller 26 is configured to adjust $I_{peak\_ref}$ and includes, or has access to, a counter (not shown in FIG. 10) that is configured to determine the PFM pulse width.

In operation during a PFM mode, the control circuitry 14 of the boost converter 110 uses the comparator 35 and the ability of the switching controller 26 to set $I_{peak\_ref}$ to reduce the dependency of $V_{ripple}$ on at least $V_{in}$ and $V_{out}$ by maintaining the PFM pulse width $t_{on\_PFM}+t_{off\_PFM}$ approximately constant. For example, a designer of the boost converter 110 can select the constant value of the PFM pulse width that provides a suitable $V_{ripple}$ at a suitable nominal input voltage $V_{in\_nominal}$.

At some point before entering, or upon entering, a PFM mode, the switching controller 26 sets $I_{peak\_ref}$ to an initial value. For example, the switching controller 26 may set $I_{peak\_ref}=\sqrt{N}\cdot I_{peak\_PWM\_discontinuous}$, where N has a value per equation (14), and $I_{peak\_PWM\_discontinuous}$ is the peak of the inductor current $I_{Inductor}(t)$ just before the switching controller transitions the boost converter 110 from a discontinuous PWM mode to a PFM mode.

During the PFM mode after the discontinuous-PWM-to-PFM transition, in response to turning on the transistor 58 to begin a PFM pulse, the switching controller 26 starts the pulse-width counter counting (either up or down) from a selected initial count value. While the transistor 58 is on and the transistor 60 is off, the output of the comparator 35 is a logic-low level because the voltage across the transistor 60 is negative, i.e., $V_{out}$ is higher than the voltage at the junction between the inductor 16 and the on transistor 58.

Next, in response to the inductor current $I_{Inductor}(t)$ equaling or exceeding $I_{peak\_ref}/R_{54}$ the comparator 56 transitions the signal LOOP_CONTROL_3 from a logic-low level to a logic-high level.

Then, in response to LOOP_CONTROL_3 transitioning from a logic-low level to a logic-high level, the switching controller 26 turns off the transistor 58 and turns on the transistor 60 to end $t_{on\_PFM}$ and to start $t_{off\_PFM}$.

Next, in response to the switching controller 26 turning on the transistor 60, the voltage across the transistor 60 transitions to a positive value due to $V_{out}$ being lower than the voltage at the junction between the inductor 16 and the on transistor 58.

Then, in response to the voltage across the transistor 60 transitioning to a positive value, the output of the comparator 35 transitions from a logic-low level to a logic-high level.

In response to the logic-low-to-logic-high transition of the output of the comparator 35, the switching controller 26 causes the pulse-width counter to continue to count.

Next, in response to the inductor current $I_{Inductor}(t)$ equaling zero, or being close to zero, at the end of $t_{off\_PFM}$, the comparator 35 transitions its output from a logic-high level to a logic-low level because $V_{out}$ equals, or is greater than, the voltage at the junction between the inductor 16 and the transistor 58.

Then, in response to the logic-high-to-logic-low transition of the output of the comparator 35, the switching controller 26 turns off the transistor 60 and stops the pulse-width counter from counting.

Next, the switching controller 26 compares the value in the counter to the previously selected constant PFM pulse width.

If the value in the counter is greater than the constant PFM pulse width, then the switching controller 26 determines that the actual PFM pulse width is too long, and reduces $I_{peak\_ref}$ by a first amount, which may be selected to impart stability to the pulse-width-adjustment loop (the pulse-width-adjustment loop may include, at least in part, the comparator 56, the pulse-width counter, and a comparator that the switching controller 26 may use to compare the count value to the selected constant PFM pulse width). For example, the first amount may be a constant value, or may be a variable value that the switching controller selects dynamically If the value in the counter equals or is close to the constant PFM pulse width, then the switching controller 26 determines that the actual PFM pulse width is of a suitable length, and does not alter $I_{peak\_ref}$.

And if the value in the counter is less than the constant PFM pulse width, then the switching controller 26 determines that the actual PFM pulse width is too short, and increases $I_{peak\_ref}$ by a second amount, which may be selected to impart stability to the pulse-width-adjustment loop. For example, the second amount may be a constant value, or may be a variable value that the switching controller dynamically selects. Furthermore, the second amount can equal, or differ from, the first amount.

The switching controller 26 repeats the above-described iterative procedure for each PFM pulse so as to drive the PFM pulse width toward, and to maintain the PFM pulse width approximately at, the selected constant value. Alternatively, the switching controller 26 may perform the above-described iterative procedure only during each $n^{th}$ PFM pulse to reduce the power consumption of the boost converter 110, where n is an integer greater than one, and where n may or may not equal m, which is described above in conjunction with FIGS. 5-7.

Referring to FIGS. 10-11, according to the above-described operations, the boost converter 110 is configured to generate PFM pulses 112, 114, and 116 for three different values of $V_{in}$ ($V_{out}$ is the same for all three pulses), according to an embodiment, where $V_{in}$ is approximately 50% of $V_{out}$ for the pulse 112, approximately 75% of $V_{out}$ for the pulse 114, and approximately 92% of $V_{out}$ for the pulse 116 (e.g., $V_{out}$=5.0 Volts). It is evident that the because the boost converter 110 allows the peak inductor current $I_{peak\_PFM}$ to change with changes in $V_{in}$, the areas under the $t_{off\_PFM}$ triangles, and thus the charges that the boost converter 110 delivers per PFM pulse, are more uniform as compared to the PFM pulses of FIG. 8 generated by the boost converter 10 of FIG. 1.

Referring to FIGS. 10 and 12, the charge delivered by the boost converter 110 per PFM pulse is relatively constant over a wider range of input voltage (with $V_{out}$ remaining constant over this range) as compared to the exponentially increasing charge delivered per PFM pulse (FIG. 9) by the boost converter 10 of FIG. 1.

But still referring to FIGS. 10 and 12, the charge delivered per PFM pulse by the boost converter 110 is significantly flatter than that of FIG. 9, but tends to fall off as $V_{in}$ approaches $V_{out}$ (e.g., while $V_{in}$ is greater than or equal to about 80% of $V_{out}$).

Referring to FIGS. 10 and 13, to reduce or reverse the delivered-charge fall off described above in conjunction with FIGS. 10 and 12, the switching controller 26 of the boost converter 110 is configured to allow an increase in the PFM pulse width $t_{on\_PFM}+t_{off\_PFM}$ as $V_{in}$ increases, according to an embodiment. For example, the switching controller 26 may increase the PFM pulse width in response to $V_{in}$ being greater than or equal to, for example, about 80% or 90% of $V_{out}$. And the amount by which the switching controller 26 increases the PFM pulse width in an application may be any amount that is determined suitable for that application.

A technique for increasing the PFM pulse width that the switching controller 26 may be configured to implement is to prevent $t_{on\_PFM}$ from falling below a selected threshold, e.g., approximately 60 nanoseconds (ns), so as to allow $I_{peak\_PFM}$ and $t_{off\_PFM}$ to increase beyond the values that they would have if the switching controller were to hold the PFM pulse width to a constant length.

Referring again to FIGS. 8-13, alternate embodiments of the boost converter 110 are contemplated. For example, alternate embodiments described above for the boost converters 10 and 70 of FIGS. 1 and 5 may also be applicable to the boost converter 110. Furthermore, instead of maintaining the PFM pulse width $t_{on\_PFM}+t_{off\_PFM}$ constant, the boost converter 110 may maintain one of $t_{on\_PFM}$ and $t_{off\_PFM}$, but not both of $t_{on\_PFM}$ and $t_{off\_PFM}$, constant. Moreover, the above-described techniques may also be useful in maintaining $V_{ripple}$ relatively constant, or at least within a suitable range, over ranges of the values L and C of the inductor 16 and capacitor 20, respectively, if the PFM pulse width is adjusted to compensate for the known values of L and C.

Figure 14:
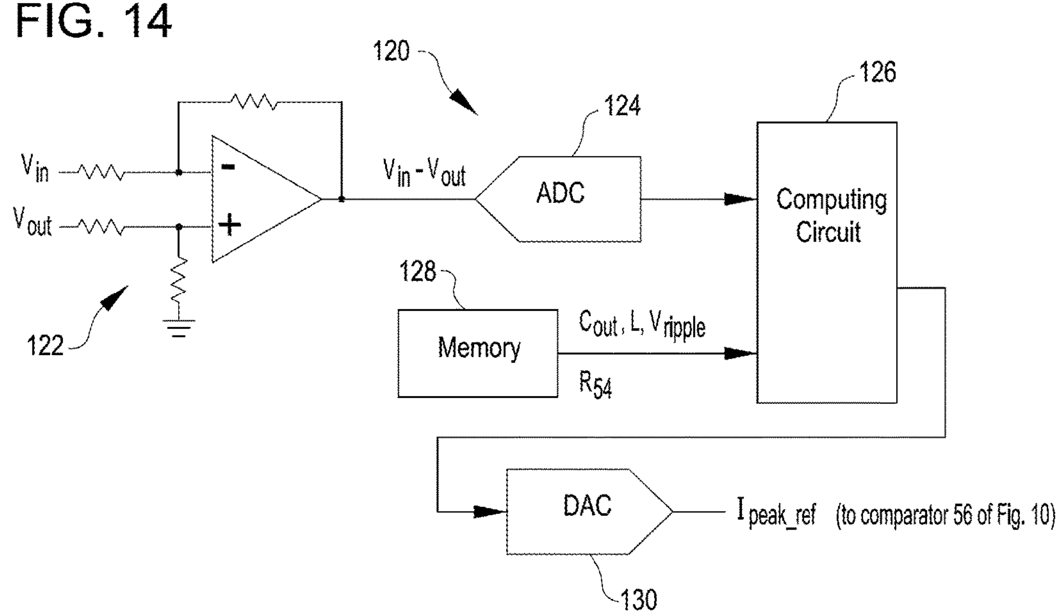
FIG. 14 is a diagram of a ripple control circuit that the power supplies of FIGS. 5 and 10 can include to set the magnitude of the ripple on the regulated output signal, according to an embodiment.
Figure 15:
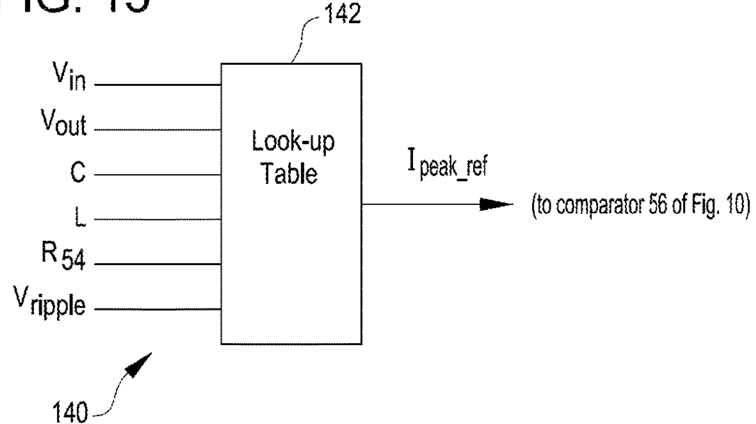
FIG. 15 is a diagram of ripple control circuit that the power supplies of FIGS. 5 and 10 can include to set the magnitude of the ripple on the regulated output signal, according to another embodiment.

Referring to FIGS. 14-15, described below is another embodiment of a technique for addressing the above-described second possible problem with the boost converter 10 of FIG. 1, which possible problem is that the output ripple voltage $V_{ripple}$ may depend heavily on quantities such as $V_{in}$ and $V_{out}$, and thus may be relatively unpredictable over a range of $V_{in}$, or from boost converter to boost converter with different $V_{out}$. According to the below-described embodiment, one can modify any of the boost converters 10, 70, and 110 of FIGS. 1, 5, and 10, respectively, such that the boost converter sets and holds $V_{ripple}$ to an approximately constant amplitude. But for brevity, only such modification of the boost converter 110 is described, it being understood that such modifications to the boost converters 1 and 70 may be similar.

Referring to the boost converter 110 of FIG. 10, the following equation relates the current through the output capacitor 20 to the voltage $V_{out}$ across this capacitor:

$$I_{Cout}(t)=C_{out}\cdot dV_{out}(t)/dt \quad (29)$$

Because during a PFM mode the load current $I_{Load}(t)$ is relatively low, one can assume that the value of $I_{Load}(t)$ contributes negligibly to $V_{ripple}$, but sets the frequency of that ripple. Therefore, in view of this assumption, one can derive from equation (29) the following equation for $V_{ripple}$:

$$V_{ripple}\approx I_{out\_avg}\cdot(T_{PFM}/C_{out}). \quad (30)$$

where $I_{out\_avg}$ is given by the following equation (because of the theoretical triangle formed by the ramping-down inductor current $I_{Inductor}(t)$ during $t_{off\_PFM}$):

$$I_{out\_avg}=I_{peak\_PFM}/2\cdot(t_{off\_PFM}/T_{PFM}) \quad (31)$$

and where $t_{off\_PFM}$ is given by equation (28).

Therefore, from equations (28), (30), and (31) one can derive the following expressions for $V_{ripple}$, $I_{peak\_PFM}$, and $I_{peak\_ref}$ as a function of $V_{ripple}$:

$$V_{ripple} = I^2_{peak\_PFM}\cdot L/[2\cdot(V_{out}-V_{in})\cdot C_{out}] \quad (32)$$

$$I_{peak\_PFM} = \sqrt{\frac{2\cdot Vripple\cdot C_{out}\cdot(V_{out}-V_{in})}{L}} \quad (33)$$

$$I_{peak\_ref} = I_{peak\_PFM}\cdot R_{54} = \sqrt{\frac{2\cdot Vripple\cdot C_{out}\cdot(V_{out}-V_{in})}{L}}\cdot R_{54} \quad (34)$$

Therefore, where $C_{out}$, $V_{out}$, $V_{in}$, L, and the desired value of $V_{ripple}$ are known, using equation (34) one can determine from these known quantities the value of $I_{peak\_ref}$ that yields the desired amplitude of the output ripple voltage $V_{ripple}$. And, as described below, one can modify the boost converter 110 of FIG. 10 to generate $V_{ripple}$ having this desired amplitude.

FIG. 14 is a diagram of a ripple-adjust circuit 120, which the control circuitry 14 of the boost converter 110 of FIG. 10 may include to set $V_{ripple}$ to an approximately constant desired level per equation (34), according to an embodiment.

The ripple-adjust circuit 120 includes a differential amplifier stage 122, an analog-to-digital converter (ADC) 124, a computing circuit 126 such as a microprocessor or microcontroller core, a memory 128, which is configured to store the values of $R_{54}$, $C_{out}$, and L, and the selected value of $V_{ripple}$, and a digital-to-analog converter (DAC) 130. The circuit 120 may also include a circuitry (not shown) for determining the values of $R_{54}$, $C_{out}$, and L if these values are not stored in the memory 128.

In operation during a PFM mode, the differential amplifier stage 122 receives $V_{in}$ on an inverting input node and $V_{out}$ on a noninverting input node, and generates $V_{out}-V_{in}$ on an output node.

The ADC 124 converts $V_{out}-V_{in}$ from an analog value to a digital value, and provides this digital value to the computing circuit 126.

In addition to receiving the digital value of $V_{out}-V_{in}$ from the ADC 124, the computing circuit 126 receives the values of $R_{54}$, $C_{out}$, L, and $V_{ripple}$ from the memory 128, and computes a corresponding digital value of $I_{peak\_ref}$ per equation (34).

The DAC 130 converts the computed digital value of $I_{peak\_ref}$ into a corresponding analog voltage $I_{peak\_ref}$, which the DAC provides to the inverting input node of the comparator 56 of the boost converter 110 of FIG. 10.

The ripple-adjust circuit 120 can repeat the above procedure periodically (e.g., once each PFM cycle, or, to reduce power consumption, once every $o^{th}$ PFM cycles, where o may or may not equal n or m, which are described above) to account for changes in $V_{in}$ or in $V_{out}$, although $V_{out}$ is typically less likely to change than $V_{in}$.

Still referring to FIG. 14, alternate embodiments of the ripple-adjust circuitry 120 are contemplated. For example, the amplifier stage 122 may be omitted, the memory 128 may store the value of $V_{out}$ (or $V_{out}$ may be otherwise provided to the computing circuit 126), the ADC 124 may receive $V_{in}$, and the computing circuit may calculate $V_{out}-V_{in}$ in addition to calculating $I_{peak\_ref}$ as described above. Furthermore, the computing circuit could account for the value of $R_{54}$ by including a settable scale factor that equals, or is otherwise equivalent to, the value of $R_{54}$.

FIG. 15 is a diagram of a ripple-adjust circuit 140, which, like the ripple-adjust circuit 120 FIG. 14, any of the boost converters 10, 70, and 110 of FIGS. 1, 5, and 10 may include to set $V_{ripple}$ to an approximately constant value per equation (34), according to an embodiment. For example purposes, the ripple-adjust circuit 140 is hereinafter described as being part of the boost converter 110 of FIG. 10, although it is understood that the structure and operation of the ripple-adjust circuit may be similar if the ripple-adjust circuit is part of another boost circuit such as the boost circuit 10 of FIG. 1 or the boost circuit 70 of FIG. 5.

The ripple-adjust circuit 140 includes a look-up table (LUT) 142, which receives values for at least some of $V_{in}$, $V_{out}$, $R_{54}$, $C_{out}$, L, and $V_{ripple}$, generates from these values a value for $I_{peak\_ref}$, and provides a voltage level corresponding to this value of $I_{peak\_ref}$ to the inverting input node of the comparator 56 of the boost converter 110 of FIG. 10. For example, the LUT 142 may receive $V_{in}$ from the boost converter 110 via an ADC, and may receive values for $R_{54}$, C, L, $V_{out}$, and $V_{ripple}$ from a memory (not shown in FIG. 15) such as the memory 128 of FIG. 14. Or, the LUT 142 may itself store values for $R_{54}$, C, L, $V_{out}$, and $V_{ripple}$. Alternatively, the LUT 142 may receive $V_{out}$ from the boost converter 110 via an ADC.

The LUT 142 may store different values of $I_{peak\_ref}$ for different ranges of any one or more of $V_{in}$, $R_{54}$, C, L, $V_{out}$, and $V_{ripple}$. For example, the LUT 142 may store a respective value of $I_{peak\_ref}$ for each 0.5 V step of $V_{in}$ from 0.5 V to $V_{out}$.

The ripple-adjust circuit 140 can repeat the above procedure periodically (e.g., once each PFM cycle, or, to reduce power consumption, once every $p^{th}$ PFM cycles, where p may or may not equal o, n, or m, which are described above) to account for changes in $V_{in}$.

Still referring to FIG. 15, alternate embodiments of the ripple-adjust circuitry 140 are contemplated. For example, the LUT 142 may be replaced by a computing circuit such as a microprocessor or microcontroller, or the ripple-adjust circuitry may include such a computing circuit in addition to the LUT.

Figure 16:
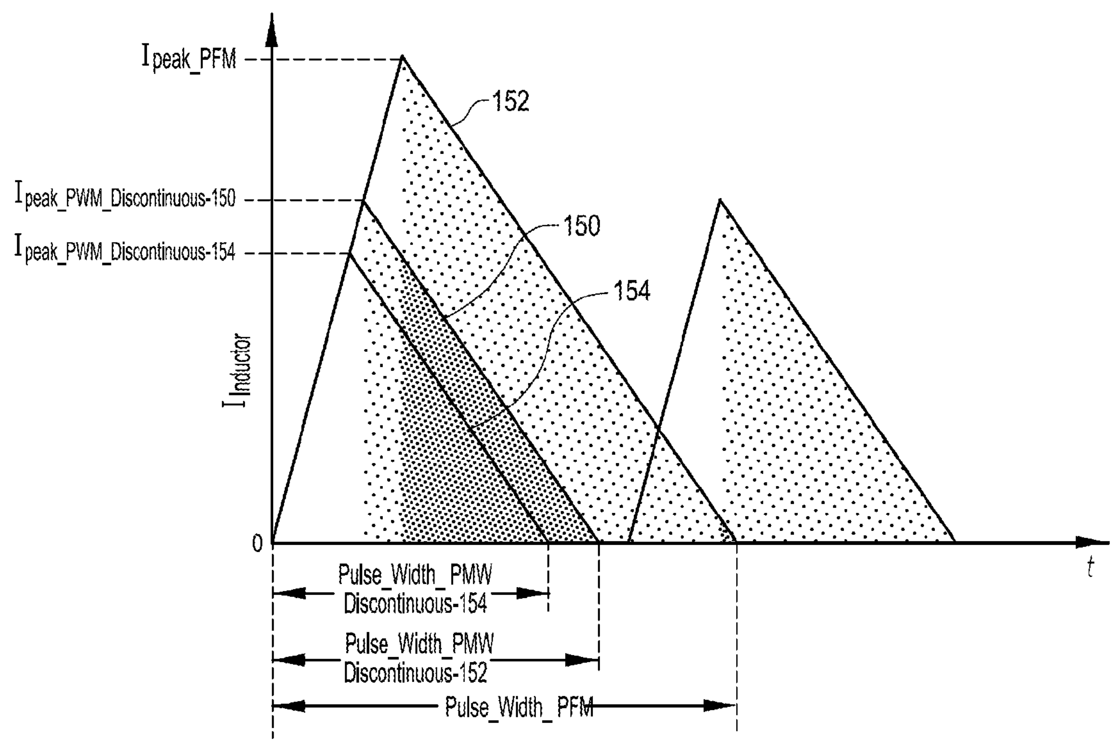
FIG. 16 is a plot of the inductor current of the power supply of FIG. 10 versus time just before and just after a transition from a discontinuous PWM mode to a PFM mode, according to an embodiment.

Referring to FIGS. 10 and 16, described below is an embodiment of a technique for addressing the third above-described possible problem with the boost converter 10 (FIG. 1), which possible problem is that transitioning from a discontinuous PWM mode to a PFM mode in response to sensing an attribute (e.g., peak, average) of the inductor current $I_{Inductor}(t)$ may result in transitioning to a PFM mode at a relatively imprecise load point, i.e., a load point that is significantly different from PWM-to-PFM transition to PWM-to-PFM transition, and may result in an imprecise hysteresis range, i.e., a range that is significantly different form PWM-to-PFM transition to PWM-to-PFM transition. For example, this imprecise (variable) hysteresis range can be caused by different levels of changing $V_{in}$ and $V_{out}$, and by inaccuracies in sensing circuitry. According to the below-described embodiment, one can modify any of the boost converters 70 and 110 of FIGS. 5 and 10, respectively, such that the boost converter transitions from a discontinuous PWM mode to a PFM mode at a relatively precise load point and with a relatively precise hysteresis range. But for brevity, only such modification of the boost converter 110 is described, it being understood that such modification to the boost converter 70 may be similar.

In an embodiment where the boost converter 110 is configured such that $f_{s\_PWM\_discontinuous}/f_{s\_PFM\_max}=N$ per equation (14) and to maintain the PFM pulse width approximately constant, or having a minimum $t_{on\_PFM}$ as described above in conjunction with FIGS. 8-13, the control circuitry 14 can transition the boost converter from a discontinuous PWM mode to a PFM mode when the PWM pulse width $Pulse\_Width_{PWM\_discontinuous}=t_{on\_PWM\_discontinuous}+t_{off\_PWM\_discontinuous}$ in discontinuous PWM mode is less than or equal to a selected length.

Per equations (2) and (21), the known PFM pulse width $Pulse\_Width_{PFM}=t_{on\_PFM}+t_{off\_PFM}$ is given by the following equation:

$$t_{on\_PFM}+t_{off\_PFM}=I_{peak\_PFM}\cdot L/V_{in}+I_{peak\_PFM}\cdot L/(V_{out}-V_{in}) \quad (35)$$

where $I_{peak\_PFM}$ is the peak of the inductor current $I_{Inductor}(t)$ during the PFM mode at the max PFM switching frequency $f_{s\_PFM\_max}$.

Per equation (25), $I_{peak\_PFM}$ is given by the following equation:

$$I_{peak\_PFM}=\sqrt{N}\cdot I_{peak\_PWM\_discontinuous} \quad (36)$$

Therefore, using equation (36) to substitute for $I_{peak\_PFM}$ in equation (35) yields the following equation:

$$t_{on\_PFM}+t_{off\_PFM}=\sqrt{N}\cdot I_{peak\_PWM\_discontinuous}\cdot L/V_{in}+\sqrt{N}\cdot I_{peak\_PWM\_discontinuous}\cdot L/(V_{out}-V_{in}) \quad (37)$$

where $I_{peak\_PWM\_discontinuous}$ is the peak current in a discontinuous PWM mode just prior to a discontinuous-PWM-to-PFM transition.

And per equations (2) and (22), $I_{peak\_PWM\_discontinuous}$ is given by the following equations:

$$I_{peak\_PWM\_discontinuous}=t_{on\_PWM\_discontinuous}\cdot V_{in}/L \quad (38)$$

$$I_{peak\_PWM\_discontinuous}=t_{off\_PWM\_discontinuous}\cdot (V_{out}-V_{in})/L \quad (39)$$

Substituting for $I_{peak\_PWM\_discontinuous}$ in equation (37) per equations (38) and (39) yields the following equation:

$$t_{on\_PFM}+t_{off\_PFM}=\sqrt{N}\cdot t_{on\_PWM\_discontinuous}\cdot (V_{in}/L)\cdot (L/V_{in})+\sqrt{N}\cdot t_{off\_PWM\_discontinuous}\cdot [(V_{out}-V_{in})/L]\cdot [L/(V_{out}-V_{in})] \quad (40)$$

Cancelling common terms, equation (40) reduces to the following equation:

$$t_{on\_PFM}+t_{off\_PFM}=\sqrt{N}\cdot (t_{on\_PWM\_discontinuous}+t_{off\_PWM\_discontinuous}) \quad (41)$$

And because $t_{on\_PFM}+t_{off\_PFM}=Pulse\text{-}Width_{PFM}$ and $t_{on\_PWM\_discontinuous}+t_{off\_PWM\_discontinuous}=Pulse\text{-}Width_{PWM\_discontinuous}$, equation (41) yields the following relation between $Pulse\_Width_{PFM}$ and $Pulse\_Width_{PWM\_discontinuous}$:

$$Pulse\_Width_{PWM\_discontinuous}=Pulse\_Width_{PFM}/\sqrt{N}. \quad (42)$$

Therefore, during a discontinuous PWM mode, in response to the PWM pulse width $Pulse\_Width_{PWM\_discontinuous}\leq Pulse\_Width_{PFM}/\sqrt{N}$, the control circuitry 14 (the switching controller 26 in the described embodiment) of the boost converter 110 "knows" that it can transition the boost converter to the PFM mode because the boost converter can, in the PFM mode at the maximum PFM switching frequency $f_{s\_PFM\_max}$, provide the load 12 with the same level of power that it is providing to the load in the discontinuous PWM mode.

Furthermore, to provide a transition buffer, i.e., a hysteresis range, the switching controller 26 may not transition the boost converter 110 to the PFM mode until $Pulse\_Width_{PWM\_discontinuous}<Pulse\_Width_{PFM}/\sqrt{N}$. The PWM pulse 150 has a $Pulse\_Width_{PWM\_discontinuous\_150}$ that is equal to $Pulse\_Width_{PFM}/\sqrt{N}$, where $Pulse\_Width_{PFM}$ is the width of the PFM pulse 152. But the switching controller 26 does not transition the boost converter 110 to the PFM mode until a PWM pulse 154 has a pulse width $Pulse\_Width_{PWM\_discontinuous\_154}$ that is less than (e.g., approximately 10% less than) $Pulse\_Width_{PFM}/\sqrt{N}$. Such a transition hysteresis range helps to prevent a situation where the switching controller 26 is transitioning (or even oscillating) back and forth between discontinuous PWM mode and PFM mode because the load 12 is at or near a "line" that is both the discontinuous-PWM-to-PFM transition line and the PFM-to-discontinuous-PWM transition line.

Still referring to FIGS. 10 and 16, the boost converter 110 can monitor $Pulse\_Width_{PWM\_discontinuous}$ using the comparator 35 and a counter (not shown in FIG. 10) in a manner similar to the manner described above in conjunction with FIGS. 8-13.

Referring to FIGS. 5-16, alternate embodiments are contemplated. For example, although boost converters 70 and 110 are described, some or all of the above-described embodiments may be applicable to power supplies other than boost converters, such as buck converters, flyback converters, inverting-boost converters, single-ended primary-inductor converters (SEPICs), and buck-boost converters.

Figure 17:
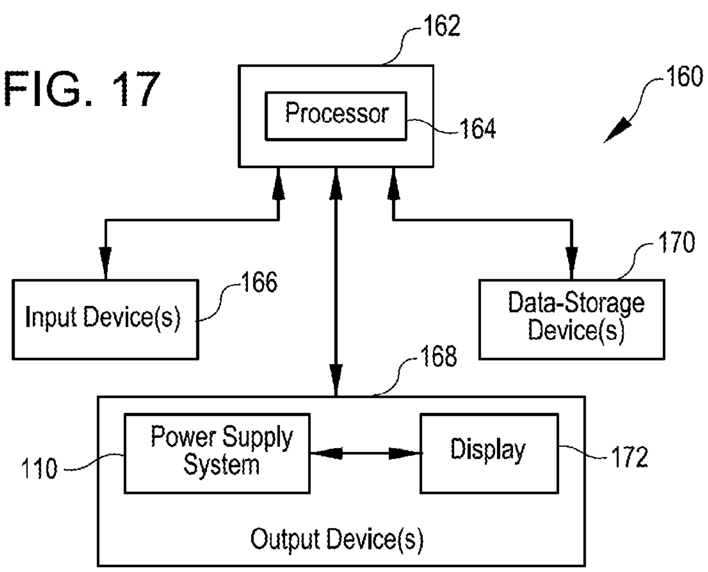
FIG. 17 is a diagram of a system that can include one or more of the power supplies of FIGS. 5 and 10, according to an embodiment.

FIG. 17 is a block diagram of an embodiment of a system or device 160, which incorporates one or more of the boost converters 10, 70 and 110 of FIGS. 1, 5, and 10, according to an embodiment; but for brevity, the device is described below as including only a single instance of the boost converter 110 of FIG. 10. Examples of the device 160 include, but are not limited to, a smart phone, pad computer, laptop computer, or personal computer. Furthermore, although the device 160 is described as a device, it may be any apparatus or system for which embodiments of one or more of the boost converters 10, 70, and 110 are suited.

The device 160 includes computing circuitry 162, which includes a processor 164; the device also includes at least one input device 166, at least one output device 168, and at least one data-storage device 170.

The at least one output device 168 includes a display 172 and the boost converter 110 of FIG. 10, which powers the display. For example, the display 172 may be a liquid-crystal display (LCD) for a smart phone.

In addition to processing data, the processor 164 may program or otherwise control the boost converter 110. For example, the functions of the boost converter's control circuitry 14 (FIG. 10) may be performed by the processor 164.

The input device (e.g., keyboard, mouse) 166 allows the providing of data, programming, and commands to the computing circuitry 162.

The display 172 (and any other included output device 168) allows the computing circuitry 162 to provide data in a form (e.g., still image or video) perceivable by a human operator.

And the data-storage device (e.g., flash drive, hard-disk drive, RAM, EPROM, EEPROM, optical drive) 170 allows for the storage of, e.g., programs and data.

Still referring to FIG. 17, alternate embodiments of the device 160 are contemplated. For example, the processor 164 may be a microprocessor or a microcontroller.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple IC dies to form one or more ICs, and these one or more ICs may be coupled to one or more other ICs. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed is:

1. A power-supply controller, comprising:

a generator configured to provide a switching signal that causes a power supply to generate a regulated output signal;

an adjuster configured to impart a condition to the power supply while the power supply is operating in a first mode, the condition being approximately equal to a condition that the power supply would have if the power supply were operating in a second mode; and a transitioner configured to cause the power supply to transition from the first mode to the second mode such that a width of a last pulse of the switching signal before the transition is different from a width of a first pulse of the switching signal after the transition.

2. The power-supply controller of claim 1 wherein while the power supply is operating in the first mode, the generator is configured to generate the switching signal having a frequency that depends on a load being powered by the power supply.

3. The power-supply controller of claim 1 wherein while the power supply is operating in the second mode, the generator is configured to generate the switching signal having a fixed frequency.

4. The power-supply controller of claim 1 wherein the condition includes a level of a control signal.

5. The power-supply controller of claim 1 wherein the condition includes a voltage level of a control signal.

6. The power-supply controller of claim 1 wherein:

the condition includes a level of a control signal; and the adjuster is configured to adjust the level of the control signal while the power supply is operating in the first mode.

7. The power-supply controller of claim 1 wherein:

while the power supply is operating in the first mode, the generator is configured to generate the switching signal having a first frequency that depends on a load being powered by the power supply;

while the power supply is operating in the second mode, the generator is configured to generate the switching signal having a fixed second frequency; and the adjuster is configured to impart the condition to the power supply by adjusting a control signal in response to a value that is related to a ratio of the second frequency to a maximum value of the first frequency.

8. The power-supply controller of claim 1 wherein:

while the power supply is operating in the first mode, the generator is configured to generate the switching signal having a first frequency that depends on a load being powered by the power supply;

while the power supply is operating in the second mode, the generator is configured to generate the switching signal having a fixed second frequency; and the transitioner is configured to cause the power supply to transition from the first mode to the second mode when a level of charge that the power supply delivers to a load during a time period while the switching signal has the first frequency is approximately equal to, or is less than, a level of energy that the power supply would deliver to the load during the same time period while the switching signal is at the fixed second frequency.

9. The power-supply controller of claim 1 wherein the transitioner is configured to cause the power supply to transition from the first mode to the second mode when a level of charge that the power supply delivers to a load during a time period in the first mode is approximately equal to, or is less than, a level of charge that the power supply would deliver to the load during the same time period in the second mode.

10. The power-supply controller of claim 1 wherein:

while the power supply is operating in the first mode, the generator is configured to generate the switching signal having a frequency that depends on a load being powered by the power supply; and the transitioner is configured to cause the power supply to transition from the first mode to the second mode in response to the frequency having a relationship to a frequency threshold.

11. A power supply, comprising:

an input node configured to receive an input signal;

an output node configured to provide a regulated output signal in response to the input signal;

a generator configured to generate a switching signal in response to a control signal during a first operating mode;

an adjuster configured to cause a value of the control signal during a second operating mode to equal approximately a value that the control signal would have in the first operating mode; and a transitioner configured to transition from the second operating mode to the first operating mode such that a width of a pulse of the switching signal immediately before the transition is different from a width of a pulse of the switching signal immediately after the transition.

12. The power supply of claim 11 wherein:
the input signal includes an input voltage; and
the output signal includes a regulated output voltage.

13. The power supply of claim 11 wherein the first mode includes a pulse-width-modulation mode.

14. The power supply of claim 11 wherein the second mode includes a pulse-frequency-modulation mode.

15. The power supply of claim 11 wherein the adjuster is configured to set the control signal in response to a feedback signal.

16. The power supply of claim 11 wherein the generator is configured to generate the switching signal independently of the control signal during the second operating mode.

17. The power supply of claim 11 wherein the adjuster is configured to cause the value of the control signal during the second operating mode to equal approximately the value that the control signal would have during the first operating mode by adjusting the control signal in response to a value that is related to a ratio of a frequency of the switching signal during the first mode to a frequency of the switching signal during the second mode.

18. The power supply of claim 11 wherein the transitioner is configured to transition from the second mode to the first mode in response to a frequency of the switching signal during the second mode being greater than or equal to a threshold.

19. The power supply of claim 11 wherein the generator and adjuster are disposed on a same integrated circuit.

20. The power supply of claim 11, further comprising:
an inductor coupled to the input node and to the output node; and
wherein during the second mode the generator is configured to generate the switching signal such that during each period of the switching signal, a charging current flows through the inductor until the charging current is greater than or equal to a current threshold.

21. The power supply of claim 11, further comprising:
an inductor coupled to the input node and to the output node; and
wherein the transitioner is configured to transition from the second mode to the first mode while there is approximately no current flowing through the inductor.

22. A system, comprising:
a power supply including
an input node configured to receive an input signal,
an output node configured to provide a regulated output signal,
a generator configured to generate a switching signal in response to a control signal during a first operating mode, and
an adjuster configured to cause a value of the control signal during a second operating mode to equal approximately a value that the control signal would have during the first operating mode; and
a transitioner configured to transition the power supply from the second operating mode to the first operating mode such that a width of a pulse of the switching signal immediately before the transition is different from a width of a pulse of the switching signal immediately after the transition; and
a load coupled to the output node.

23. The system of claim 22 wherein the power supply includes a boost converter.

24. The system of claim 22 wherein the load includes an integrated circuit.

25. A method, comprising:
generating a regulated output signal using a first feedback signal and independently of a first control signal;
generating the first control signal
while generating the regulated output signal independently of the first control signal, and
in response to a combination of the first feedback signal and a ration of a frequency of the switching signal during a first operating mode and a frequency of the switching signal during a second operating mode, and
during the first operating mode, generating a switching signal in response to the regulated output signal and the first feedback signal, and independently of the first control signal.

26. The method of claim 25, further comprising:
wherein the regulated output signal includes a regulated output voltage;
wherein the first feedback signal includes a signal that is related to a current flowing through an inductor; and
the first control signal is related to a load that is coupled to the regulated output voltage.

27. The method of claim 25 wherein generating the first control signal includes generating a voltage across a capacitor.

28. The method of claim 25 wherein generating the first control signal includes generating the first control signal further in response to a second control signal.

29. The method of claim 25 wherein generating the first control signal includes generating the first control signal further in response to a combination of a ramp signal and the ratio.

* * * * *

UNITED STATES PATENT AND TRADEMARK OFFICE

CERTIFICATE OF CORRECTION

PATENT NO. : 9,722,490 B2
APPLICATION NO. : 14/231691
DATED : August 1, 2017
INVENTOR(S) : Archibald It is certified that error appears in the above-identified patent and that said Letters Patent is hereby corrected as shown below:

On the Title Page

In the Figure, delete Tag "10" and insert Tag -- 70 --, therefor.

In the Drawings

Fig. 2, Drawing Sheet 2 of 9, delete "$I_{peak\_pwm\_continuous}$" and insert -- $I_{peak\_PWM\_continuous}$ --, therefor.

Fig. 3, Drawing Sheet 2 of 9, delete "$I_{0=0}$" and insert -- $I_{o=0}$ --, therefor.

Fig. 3, Drawing Sheet 2 of 9, delete "$T_{Zero\_inductor\text{-}current}$" and insert -- $T_{zero\_inductor\_current}$ --, therefor.

Fig. 4, Drawing Sheet 2 of 9, delete "$T_{Zero\_inductor\text{-}current}$" and insert -- $T_{zero\_inductor\_current}$ --, therefor.

Fig. 5, Drawing Sheet 3 of 9, delete Tag "10" and insert Tag -- 50 --, therefor.

Fig. 10, Drawing Sheet 6 of 9, delete Tag "10" and insert Tag -- 110 --, therefor.

Fig. 16, Drawing Sheet 9 of 9, delete "Pulse_Width_PMW Discontinuous-154" and insert -- Pulse_Width_PWM_Discontinuous-154 --, therefor.

Fig. 16, Drawing Sheet 9 of 9, delete "Pulse_Width_PMW Discontinuous-152" and insert -- Pulse_Width_PWM_Discontinuous-152 --, therefor.

Fig. 17, Drawing Sheet 9 of 9, for Tag "110", Lines 1-2, delete "Power Supply System" and insert -- Boost Converter --, therefor.

In the Specification

Column 1, Line 60, delete "FIG. 5 diagram" and insert -- FIG. 5 is a diagram --, therefor.

Signed and Sealed this
Twenty-eighth Day of August, 2018

Andrei Iancu
*Director of the United States Patent and Trademark Office*

Column 3, Line 23, delete "$f_{s\_PWM,}$" and insert -- $f_{s\_PFM,}$ --, therefor.

Column 5, Line 21, delete "amplifier 56," and insert -- amplifier 38, --, therefor.

Column 5, Line 33, delete "$I_{PEAK\_REF\_PWM\_DISCONTINOUS}$" and insert -- $I_{PEAK\_REF\_PWM\_DISCONTINUOUS}$ --, therefor.

Column 5, Line 49, delete "$I_{PEAK\_REF}=I_{PEAK\_REF\_PWM}$," and insert -- $I_{PEAK\_REF}=I_{PEAK\_REF\_PWM}$; --, therefor.

Column 7, Line 34, delete "$I_{Iinductor}(t)$" and insert -- $I_{Inductor}(t)$ --, therefor.

Column 7, Line 56, delete "$I_{Inductor}(t)=I_o(t)$" and insert -- $I_{Inductor}(t)=I_{out}(t)$ --, therefor.

Column 11, Line 4, delete "$T_{zero\text{-}inductor\_current}$" and insert -- $T_{zero\_inductor\_current}$ --, therefor.

Column 11, Line 6, delete "Iinductor(t)" and insert -- IInductor(t) --, therefor.

Column 11, Line 9, delete "Iinductor(t)" and insert --IInductor(t) --, therefor.

Column 11, Line 25, delete "$T_{on\_PWM\_discontinuous}+T_{off\_PWM\_discontinous})=$" and insert -- $T_{on\_PWM\_discontinuous}+T_{off\_PWM\_discontinuous})=$ --, therefor.

Column 13, Line 55, delete "$I_{load}$" and insert -- $I_{Load}$ --, therefor.

Column 15, Line 34, delete "$S=I_{peak\_PWM\_discontinous}/I_{peak\_PFM}$" and insert -- $S=I_{peak\_PWM\_discontinuous}/I_{peak\_PFM}$ --, therefor.

Column 16, Line 1, delete "$I_{peak\_PWM\_discontinous}$" and insert -- $I_{peak\_PWM\_discontinuous}$ --, therefor.

Column 19, Line 21, delete "SWITCHING_CONTROL_," and insert -- SWITCHING_CONTROL, --, therefor.

Column 21, Lines 5-6, delete "$I_{Iinductor}(t)$ during the period $t_{on\_PFM}$ $t_{off\_PFM}$)" and insert -- $I_{Inductor}(t)$ during the period $t_{on\_PFM}$ + $t_{off\_PFM}$) --, therefor.

Column 21, Lines 5-6, delete "$I_{Iinductor}(t)$ during the period $t_{on\_PFM}$ $t_{off\_PFM}$)" and insert -- $I_{Inductor}(t)$ during the period $t_{on\_PFM}$ + $t_{off\_PFM}$) --, therefor.

Column 23, Line 6, delete "$I_{Iinductor}(t)$" and insert -- $I_{Inducor}(t)$ --, therefor.

Column 23, Line 7, delete "$I_{peak\_ref}/R_{54}$" and insert -- $I_{peak\_ref}/R_{54}$, --, therefor.

Column 23, Line 48, delete "dynamically" and insert -- dynamically. --, therefor.

Column 25, Line 9, delete "converters 1 and 70" and insert -- converters 10 and 70 --, therefor.

Column 26, Line 31, delete “120 FIG. 14,” and insert -- 120 of FIG. 14, --, therefor.

Column 27, Line 31, delete “$t_{on\_PFM}$” and insert -- $t_{on\_PFM}$, --, therefor.

In the Claims

Column 32, Line 7, in Claim 22, delete “mode; and” and insert -- mode; --, therefor.

Column 32, Line 25, in Claim 25, delete “ration” and insert -- ratio --, therefor.